(12) United States Patent
Dinan

(10) Patent No.: US 10,530,438 B2
(45) Date of Patent: *Jan. 7, 2020

(54) BEAMFORMING HANDOVER MESSAGING IN A WIRELESS NETWORK

(71) Applicant: Comcast Cable Communications, LLC, Philadelphia, PA (US)

(72) Inventor: Esmael Hejazi Dinan, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 38 days.

This patent is subject to a terminal disclaimer.

(21) Appl. No.: 15/879,570

(22) Filed: Jan. 25, 2018

(65) Prior Publication Data
US 2018/0152223 A1 May 31, 2018

Related U.S. Application Data

(63) Continuation of application No. 15/229,671, filed on Aug. 5, 2016, now Pat. No. 9,917,624, which is a
(Continued)

(51) Int. Cl.
*H04W 4/00* (2018.01)
*H04W 36/00* (2009.01)
(Continued)

(52) U.S. Cl.
CPC ............ *H04B 7/046* (2013.01); *H04B 7/043* (2013.01); *H04B 7/0417* (2013.01);
(Continued)

(58) Field of Classification Search
CPC . H04W 36/08; H04W 36/30; H04W 36/0055; H04W 36/0083; H04W 36/0072;
(Continued)

(56) References Cited

U.S. PATENT DOCUMENTS 6,314,305 B1   11/2001   Solondz et al.
7,480,509 B2 *  1/2009   Kang ................... H04W 36/08
                                                   370/331
(Continued)

FOREIGN PATENT DOCUMENTS

EP    2858265 A1    4/2015
JP    2010178237 A  8/2010
(Continued)

OTHER PUBLICATIONS

3GPP TS 36.213 V10.0.0 (Dec. 2010), 3rd Generation Partnership Project; Technical Specification Group Radio Access Network; Evolved Universal Terrestrial Radio Access (E-UTRA); Physical layer procedures (Release 10), pp. 1-98 dated 2010.
(Continued)

*Primary Examiner* — Thai D Hoang
(74) *Attorney, Agent, or Firm* — Baner & Witcoff, Ltd.

(57) ABSTRACT

A wireless device may support a plurality of channel state information (CSI) processes. The wireless device may send an indication of a number of supported CSI processes to a first base station. The first base station may send an indication of a number of CSI processes supported by the wireless to a second base station. This information may be used during handover of the wireless device.

32 Claims, 15 Drawing Sheets

Related U.S. Application Data continuation of application No. 14/797,134, filed on Jul. 12, 2015, now Pat. No. 9,450,656, which is a continuation of application No. 14/705,497, filed on May 6, 2015, now Pat. No. 9,131,414, which is a continuation of application No. 14/538,380, filed on Nov. 11, 2014, now Pat. No. 9,112,556, which is a continuation of application No. 13/720,920, filed on Dec. 19, 2012, now Pat. No. 8,913,593.

(60) Provisional application No. 61/577,206, filed on Dec. 19, 2011, provisional application No. 61/577,203, filed on Dec. 19, 2011, provisional application No. 61/577,208, filed on Dec. 19, 2011.

(51) Int. Cl.

| | | |
|---|---|---|
| *H04B 7/0456* | (2017.01) | |
| *H04W 72/04* | (2009.01) | |
| *H04W 24/02* | (2009.01) | |
| *H04B 7/0417* | (2017.01) | |
| *H04W 36/08* | (2009.01) | |
| *H04W 36/30* | (2009.01) | |
| *H04W 36/24* | (2009.01) | |
| *H04L 25/03* | (2006.01) | |
| *H04L 27/26* | (2006.01) | |
| *H04B 7/06* | (2006.01) | |
| *H04B 7/0426* | (2017.01) | |
| *H04W 72/08* | (2009.01) | |
| *H04J 11/00* | (2006.01) | |
| *H04L 5/00* | (2006.01) | |
| *H04W 28/02* | (2009.01) | |
| *H04W 74/00* | (2009.01) | |
| *H04W 88/08* | (2009.01) | |

(52) U.S. Cl.
CPC ......... *H04B 7/0456* (2013.01); *H04B 7/0473* (2013.01); *H04B 7/0478* (2013.01); *H04B 7/063* (2013.01); *H04B 7/0617* (2013.01); *H04B 7/0626* (2013.01); *H04B 7/0634* (2013.01); *H04B 7/0639* (2013.01); *H04J 11/0056* (2013.01); *H04L 5/0023* (2013.01); *H04L 5/0053* (2013.01); *H04L 5/0073* (2013.01); *H04L 25/03955* (2013.01); *H04L 27/2646* (2013.01); *H04W 24/02* (2013.01); *H04W 28/0236* (2013.01); *H04W 36/0005* (2013.01); *H04W 36/0055* (2013.01); *H04W 36/0072* (2013.01); *H04W 36/0094* (2013.01); *H04W 36/08* (2013.01); *H04W 36/24* (2013.01); *H04W 36/30* (2013.01); *H04W 72/042* (2013.01); *H04W 72/044* (2013.01); *H04W 72/0406* (2013.01); *H04W 72/046* (2013.01); *H04W 72/0426* (2013.01); *H04W 72/0453* (2013.01); *H04W 72/082* (2013.01); *H04W 74/002* (2013.01); *H04W 88/08* (2013.01)

(58) Field of Classification Search
CPC . H04W 36/0088; H04W 36/04; H04W 36/12; H04W 36/18; H04W 36/38; H04W 36/24; H04W 36/26; H04W 36/06; H04W 36/0061
USPC .......... 370/331–334; 455/436–444
See application file for complete search history.

(56) References Cited

U.S. PATENT DOCUMENTS

| | | |
|---|---|---|
| 7,693,100 B2 | 4/2010 | Cho et al. |
| 7,724,722 B2 | 5/2010 | Seo et al. |
| 7,801,231 B2 | 9/2010 | Tarokh et al. |
| 8,099,052 B2 | 1/2012 | Cho et al. |
| 8,265,629 B2 | 9/2012 | Kwon et al. |
| 8,280,444 B1 | 10/2012 | Shen et al. |
| 8,369,788 B2 | 2/2013 | Kim et al. |
| 8,385,452 B2 | 2/2013 | Gorokhov |
| 8,385,968 B2 | 2/2013 | Kim et al. |
| 8,427,976 B1 | 4/2013 | Dinan |
| 8,483,292 B2 | 7/2013 | Wang et al. |
| 8,488,440 B2 | 7/2013 | Venturino et al. |
| 8,526,459 B2 | 9/2013 | Dinan |
| 8,537,911 B2 | 9/2013 | Sayana et al. |
| 8,538,482 B2 | 9/2013 | Koo et al. |
| 8,565,333 B2 | 10/2013 | Seo et al. |
| 8,576,794 B1 | 11/2013 | Dinan |
| 8,583,134 B2 | 11/2013 | Hou et al. |
| 8,614,981 B2 | 12/2013 | Mallik et al. |
| 8,649,344 B2 | 2/2014 | Xu et al. |
| 8,681,651 B2 | 3/2014 | Bhattad et al. |
| 8,750,152 B2 | 6/2014 | Koo et al. |
| 8,750,251 B2 | 6/2014 | Shin et al. |
| 8,768,393 B2 | 7/2014 | Shirani-Mehr et al. |
| 8,774,850 B2 | 7/2014 | Koo et al. |
| 8,792,881 B2 | 7/2014 | Koo et al. |
| 8,797,966 B2 | 8/2014 | Dinan |
| 8,837,619 B2 | 9/2014 | Shin et al. |
| 8,838,164 B2 | 9/2014 | Koo et al. |
| 8,848,673 B2 | 9/2014 | Dinan |
| 8,879,496 B2 | 11/2014 | Dinan |
| 8,885,569 B2 | 11/2014 | Dinan |
| 8,908,679 B2 | 12/2014 | Dinan |
| 8,913,592 B2 | 12/2014 | Dinan |
| 8,913,593 B2 * | 12/2014 | Dinan .................. H04B 7/0456 370/332 |
| 8,923,905 B2 | 12/2014 | Montojo et al. |
| 8,953,699 B2 | 2/2015 | Sayana et al. |
| 8,971,316 B1 | 3/2015 | Dinan |
| 8,983,397 B2 | 3/2015 | Gorokhov |
| 8,995,300 B2 | 3/2015 | Dinan |
| 9,002,345 B2 | 4/2015 | Lee et al. |
| 9,008,582 B2 | 4/2015 | Barbieri et al. |
| 9,019,845 B2 | 4/2015 | Prakash et al. |
| 9,025,487 B2 | 5/2015 | Hugl et al. |
| 9,048,885 B2 | 6/2015 | Kim et al. |
| 9,077,503 B2 | 7/2015 | Ng |
| 9,100,958 B2 | 8/2015 | Dinan |
| 9,106,285 B1 | 8/2015 | Dinan |
| 9,112,556 B2 * | 8/2015 | Dinan .................. H04B 7/0456 |
| 9,112,564 B2 | 8/2015 | Dinan |
| 9,113,388 B1 * | 8/2015 | Dinan .................. H04B 7/0456 |
| 9,131,414 B1 * | 9/2015 | Dinan .................. H04B 7/0456 |
| 9,450,656 B2 * | 9/2016 | Dinan .................. H04B 7/0456 |
| 9,455,775 B2 * | 9/2016 | Dinan .................. H04B 7/0456 |
| 9,680,544 B2 | 6/2017 | Dinan |
| 9,917,624 B2 * | 3/2018 | Dinan .................. H04B 7/0456 |
| 9,917,625 B2 * | 3/2018 | Dinan .................. H04B 7/0456 |
| 2005/0197124 A1 * | 9/2005 | Kang .................. H04W 36/30 455/439 |
| 2005/0197126 A1 * | 9/2005 | Kang .................. H04W 36/08 455/442 |
| 2005/0265436 A1 | 12/2005 | Suh et al. |
| 2006/0155533 A1 | 7/2006 | Lin et al. |
| 2006/0276189 A1 * | 12/2006 | Kieman .................. H04W 36/14 455/436 |
| 2007/0249355 A1 * | 10/2007 | Kang .................. H04W 36/30 455/439 |
| 2008/0037398 A1 | 2/2008 | Verschuren et al. |
| 2008/0132262 A1 | 6/2008 | Jung et al. |
| 2008/0192856 A1 | 8/2008 | Jongren et al. |
| 2008/0247475 A1 | 10/2008 | Kim et al. |
| 2008/0285667 A1 | 11/2008 | Mondal et al. |
| 2008/0304464 A1 | 12/2008 | Borkar et al. |

(56) References Cited

U.S. PATENT DOCUMENTS

| | | | |
|---|---|---|---|
| 2009/0028112 A1* | 1/2009 | Attar | H04W 36/245 370/332 |
| 2009/0036124 A1* | 2/2009 | Kim | H04W 36/30 455/434 |
| 2009/0046807 A1 | 2/2009 | Xia et al. | |
| 2009/0143089 A1* | 6/2009 | Ji | H04W 36/0055 455/517 |
| 2009/0195455 A1 | 8/2009 | Kim et al. | |
| 2009/0201861 A1 | 8/2009 | Kotecha | |
| 2009/0201903 A1 | 8/2009 | Ghady et al. | |
| 2009/0202015 A1 | 8/2009 | Kwon et al. | |
| 2009/0252091 A1 | 10/2009 | Tang et al. | |
| 2009/0304109 A1 | 12/2009 | Kotecha | |
| 2010/0003986 A1* | 1/2010 | Chen | H04W 36/0088 455/436 |
| 2010/0019942 A1 | 1/2010 | Pletersek et al. | |
| 2010/0035555 A1 | 2/2010 | Bala et al. | |
| 2010/0048935 A1 | 2/2010 | Mijolovic et al. | |
| 2010/0062904 A1 | 3/2010 | Crawford et al. | |
| 2010/0064334 A1 | 3/2010 | Blackburn et al. | |
| 2010/0065047 A1 | 3/2010 | Wang | |
| 2010/0081913 A1 | 4/2010 | Cross et al. | |
| 2010/0088511 A1 | 4/2010 | Tavernier et al. | |
| 2010/0088512 A1 | 4/2010 | Schwartz et al. | |
| 2010/0100572 A1 | 4/2010 | Schiller | |
| 2010/0100578 A1 | 4/2010 | Dao et al. | |
| 2010/0110526 A1 | 5/2010 | Chui | |
| 2010/0123587 A1 | 5/2010 | Walls | |
| 2010/0131341 A1 | 5/2010 | McKay et al. | |
| 2010/0173659 A1 | 7/2010 | Shin et al. | |
| 2010/0189002 A1 | 7/2010 | Choi et al. | |
| 2010/0202348 A1 | 8/2010 | Sambhwani | |
| 2010/0238913 A1 | 9/2010 | Xia et al. | |
| 2010/0239037 A1 | 9/2010 | Tang et al. | |
| 2010/0246490 A1* | 9/2010 | Lavi | H04L 1/18 370/328 |
| 2010/0285792 A1 | 11/2010 | Chen et al. | |
| 2011/0033079 A1 | 2/2011 | Liou et al. | |
| 2011/0035807 A1 | 2/2011 | Alberth et al. | |
| 2011/0040303 A1 | 2/2011 | Iannotti | |
| 2011/0041271 A1 | 2/2011 | Huang | |
| 2011/0041972 A1 | 2/2011 | Kageyama | |
| 2011/0044937 A1 | 2/2011 | Bell et al. | |
| 2011/0048226 A1 | 3/2011 | Yagi et al. | |
| 2011/0064158 A1 | 3/2011 | Li et al. | |
| 2011/0069164 A1 | 3/2011 | Ozawa et al. | |
| 2011/0079759 A1 | 4/2011 | Ojeda | |
| 2011/0080964 A1 | 4/2011 | Shamsi et al. | |
| 2011/0085507 A1 | 4/2011 | Jongren | |
| 2011/0090976 A1 | 4/2011 | Kim et al. | |
| 2011/0097999 A1 | 4/2011 | Hansen et al. | |
| 2011/0103503 A1 | 5/2011 | Shin et al. | |
| 2011/0135407 A1 | 6/2011 | Koga | |
| 2011/0135408 A1 | 6/2011 | Saji | |
| 2011/0170427 A1 | 7/2011 | Koivisto et al. | |
| 2011/0176633 A1 | 7/2011 | Ojard et al. | |
| 2011/0207487 A1 | 8/2011 | Yang et al. | |
| 2011/0212684 A1 | 9/2011 | Nam et al. | |
| 2011/0243098 A1 | 10/2011 | Koivisto et al. | |
| 2011/0286341 A1 | 11/2011 | Sanayei et al. | |
| 2011/0305223 A1 | 12/2011 | Koo et al. | |
| 2012/0002568 A1 | 1/2012 | Tiirola et al. | |
| 2012/0020230 A1 | 1/2012 | Chen et al. | |
| 2012/0033571 A1 | 2/2012 | Shimezawa et al. | |
| 2012/0063500 A1 | 3/2012 | Wang et al. | |
| 2012/0083282 A1 | 4/2012 | Choi et al. | |
| 2012/0089861 A1 | 4/2012 | Cardinell et al. | |
| 2012/0093415 A1 | 4/2012 | Robinson et al. | |
| 2012/0105936 A1 | 5/2012 | Tsuboi et al. | |
| 2012/0113801 A1 | 5/2012 | Robinson | |
| 2012/0113816 A1 | 5/2012 | Bhattad et al. | |
| 2012/0113830 A1 | 5/2012 | Zhu et al. | |
| 2012/0130291 A1 | 5/2012 | Dillingham et al. | |
| 2012/0236736 A1 | 9/2012 | Frank et al. | |
| 2012/0269077 A1 | 10/2012 | Bazzi et al. | |
| 2012/0270535 A1 | 10/2012 | Chen et al. | |
| 2012/0300662 A1 | 11/2012 | Wang et al. | |
| 2012/0314792 A1 | 12/2012 | Tesanovic et al. | |
| 2013/0008468 A1 | 1/2013 | Bertram et al. | |
| 2013/0018051 A1 | 1/2013 | Singh et al. | |
| 2013/0021925 A1 | 1/2013 | Yin et al. | |
| 2013/0021929 A1 | 1/2013 | Kim | |
| 2013/0038044 A1 | 2/2013 | Nagasawa et al. | |
| 2013/0058307 A1 | 3/2013 | Kim et al. | |
| 2013/0077513 A1 | 3/2013 | Ng et al. | |
| 2013/0077514 A1 | 3/2013 | Dinan | |
| 2013/0078991 A1 | 3/2013 | Nam | |
| 2013/0087973 A1 | 4/2013 | Bettner | |
| 2013/0100898 A1 | 4/2013 | Zhu et al. | |
| 2013/0114524 A1 | 5/2013 | Sirotkin et al. | |
| 2013/0114658 A1 | 5/2013 | Davydov et al. | |
| 2013/0115999 A1 | 5/2013 | Sirotkin et al. | |
| 2013/0122986 A1 | 5/2013 | Storm et al. | |
| 2013/0124351 A1 | 5/2013 | Fisher | |
| 2013/0125058 A1 | 5/2013 | Lee et al. | |
| 2013/0136932 A1 | 5/2013 | Hassan et al. | |
| 2013/0143618 A1 | 6/2013 | Seshadri | |
| 2013/0148515 A1 | 6/2013 | Ribeiro et al. | |
| 2013/0155891 A1 | 6/2013 | Dinan | |
| 2013/0155897 A1 | 6/2013 | Ihm et al. | |
| 2013/0155975 A1 | 6/2013 | Dinan | |
| 2013/0156008 A1 | 6/2013 | Dinan | |
| 2013/0156009 A1 | 6/2013 | Dinan | |
| 2013/0156010 A1 | 6/2013 | Dinan | |
| 2013/0201896 A1 | 8/2013 | Ono et al. | |
| 2013/0208604 A1 | 8/2013 | Lee et al. | |
| 2013/0223547 A1 | 8/2013 | Zhou et al. | |
| 2013/0242921 A1 | 9/2013 | Kim et al. | |
| 2013/0258897 A1 | 10/2013 | Park et al. | |
| 2013/0272206 A1 | 10/2013 | Li et al. | |
| 2013/0279403 A1 | 10/2013 | Takaoka et al. | |
| 2013/0279424 A1 | 10/2013 | Lee et al. | |
| 2013/0279455 A1 | 10/2013 | Park et al. | |
| 2013/0294288 A1 | 11/2013 | Choi et al. | |
| 2013/0294385 A1 | 11/2013 | Dinan | |
| 2013/0294393 A1 | 11/2013 | Park et al. | |
| 2013/0301448 A1 | 11/2013 | Sayana et al. | |
| 2013/0336152 A1 | 12/2013 | Zhu et al. | |
| 2013/0343299 A1 | 12/2013 | Sayana et al. | |
| 2013/0343317 A1 | 12/2013 | Etemad et al. | |
| 2014/0003270 A1 | 1/2014 | Maltsev et al. | |
| 2014/0005899 A1 | 1/2014 | Byers et al. | |
| 2014/0009995 A1 | 1/2014 | Amarillo et al. | |
| 2014/0010021 A1 | 1/2014 | Lee et al. | |
| 2014/0016714 A1 | 1/2014 | Chen et al. | |
| 2014/0023419 A1 | 1/2014 | Morgan | |
| 2014/0026576 A1 | 1/2014 | Bonati et al. | |
| 2014/0033657 A1 | 2/2014 | Cere' | |
| 2014/0053331 A1 | 2/2014 | Andersen et al. | |
| 2014/0057670 A1 | 2/2014 | Lim et al. | |
| 2014/0060210 A1 | 3/2014 | Jeon et al. | |
| 2014/0061449 A1 | 3/2014 | Tunheim et al. | |
| 2014/0071943 A1 | 3/2014 | Lee et al. | |
| 2014/0072185 A1 | 3/2014 | Dunlap et al. | |
| 2014/0072904 A1 | 3/2014 | Takano et al. | |
| 2014/0084024 A1 | 3/2014 | Benda et al. | |
| 2014/0086114 A1 | 3/2014 | Ng | |
| 2014/0099893 A1 | 4/2014 | Kheirkhahi et al. | |
| 2014/0110922 A1 | 4/2014 | Uchida | |
| 2014/0112184 A1 | 4/2014 | Chai | |
| 2014/0116704 A1 | 5/2014 | Reddy et al. | |
| 2014/0121391 A1 | 5/2014 | Murphy | |
| 2014/0121830 A1 | 5/2014 | Gromley et al. | |
| 2014/0123001 A1 | 5/2014 | M. et al. | |
| 2014/0128968 A1 | 5/2014 | Benichou et al. | |
| 2014/0136995 A1 | 5/2014 | Matas | |
| 2014/0138300 A1 | 5/2014 | Wietharn | |
| 2014/0146113 A1 | 5/2014 | Shimizu et al. | |
| 2014/0192757 A1 | 7/2014 | Lee et al. | |
| 2014/0211684 A1 | 7/2014 | Liu et al. | |
| 2014/0219143 A1 | 8/2014 | He et al. | |
| 2014/0226746 A1 | 8/2014 | Ko et al. | |
| 2014/0247749 A1 | 9/2014 | Kim et al. | |

(56) References Cited

U.S. PATENT DOCUMENTS

| | | |
|---|---|---|
| 2014/0254708 A1 | 9/2014 | Seo et al. |
| 2014/0269591 A1 | 9/2014 | Dinan |
| 2014/0269596 A1 | 9/2014 | Kim et al. |
| 2014/0321306 A1 | 10/2014 | Nam et al. |
| 2014/0376485 A1 | 12/2014 | Lee et al. |
| 2015/0009538 A1 | 1/2015 | Ogawa et al. |
| 2015/0009946 A1 | 1/2015 | Dinan |
| 2015/0018030 A1 | 1/2015 | Park et al. |
| 2015/0023194 A1 | 1/2015 | Seo et al. |
| 2015/0030197 A1 | 1/2015 | Pavlov et al. |
| 2015/0031242 A1 | 1/2015 | Hasegawa et al. |
| 2015/0035556 A1 | 2/2015 | Kaltalioglu |
| 2015/0035760 A1 | 2/2015 | Wu et al. |
| 2015/0049698 A1 | 2/2015 | Liu et al. |
| 2015/0054669 A1 | 2/2015 | Okuyama |
| 2015/0055115 A1 | 2/2015 | Pedersen et al. |
| 2015/0063268 A1 | 3/2015 | Dinan |
| 2015/0063308 A1 | 3/2015 | Dinan |
| 2015/0063314 A1 | 3/2015 | Dinan |
| 2015/0063488 A1 | 3/2015 | Dinan |
| 2015/0065231 A1 | 3/2015 | Anderson et al. |
| 2015/0071202 A1 | 3/2015 | Liu et al. |
| 2015/0082696 A1 | 3/2015 | Barendregt et al. |
| 2015/0085693 A1 | 3/2015 | Dinan |
| 2015/0086445 A1 | 3/2015 | Lee et al. |
| 2015/0103764 A1 | 4/2015 | Deng et al. |
| 2015/0146561 A1 | 5/2015 | Jung et al. |
| 2015/0163775 A1 | 6/2015 | Dinan |
| 2015/0173064 A1 | 6/2015 | Kim et al. |
| 2015/0207546 A1 | 7/2015 | Dinan |
| 2015/0215090 A1 | 7/2015 | Sayana et al. |
| 2015/0237542 A1 | 8/2015 | Dinan |
| 2015/0237558 A1 | 8/2015 | Dinan |
| 2015/0319649 A1* | 11/2015 | Dinan .......... H04B 7/0456 370/331 |
| 2015/0327108 A1 | 11/2015 | Dinan |
| 2015/0372730 A1 | 12/2015 | Dinan |
| 2017/0034752 A1 | 2/2017 | Dinan |
| 2018/0152225 A1* | 5/2018 | Dinan .......... H04B 7/0456 |

FOREIGN PATENT DOCUMENTS

| | | |
|---|---|---|
| JP | 2010246113 A | 10/2010 |
| JP | 2012507203 A | 3/2012 |
| JP | 2014075676 A | 4/2014 |
| JP | 2014093620 A | 5/2014 |
| JP | 2014514837 A | 6/2014 |
| JP | 2014143734 A | 8/2014 |
| JP | 2014523200 A | 9/2014 |
| JP | 2014524718 A | 9/2014 |
| JP | 2014529945 A | 11/2014 |
| JP | 2014530580 A | 11/2014 |
| JP | 2014534667 A | 12/2014 |
| JP | 2014534769 A | 12/2014 |
| JP | 2014534771 A | 12/2014 |
| JP | 2015008530 A | 1/2015 |
| JP | 2015019394 A | 1/2015 |
| JP | 2015511078 A | 4/2015 |
| JP | 2015097329 A | 5/2015 |
| JP | 2015519019 A | 7/2015 |
| JP | 2015525525 A | 9/2015 |
| KR | 20080037398 A | 4/2008 |
| KR | 20100019942 A | 2/2010 |
| KR | 20100048935 A | 5/2010 |
| KR | 100964438 B1 | 6/2010 |
| KR | 20100062904 A | 6/2010 |
| KR | 20100064334 A | 6/2010 |
| KR | 20100065047 A | 6/2010 |
| KR | 20100081913 A | 7/2010 |
| KR | 20100088511 A | 8/2010 |
| KR | 20100088512 A | 8/2010 |
| KR | 20100100572 A | 9/2010 |
| KR | 20100100578 A | 9/2010 |
| KR | 20100110526 A | 10/2010 |
| KR | 20100123587 A | 11/2010 |
| KR | 20100131341 A | 12/2010 |
| KR | 20110033079 A | 3/2011 |
| KR | 20110035807 A | 4/2011 |
| KR | 20110040303 A | 4/2011 |
| KR | 20110041271 A | 4/2011 |
| KR | 20110041972 A | 4/2011 |
| KR | 20110044937 A | 5/2011 |
| KR | 20110048226 A | 5/2011 |
| KR | 20110069164 A | 6/2011 |
| KR | 20110079759 A | 7/2011 |
| KR | 20110097999 A | 8/2011 |
| KR | 20110135407 A | 12/2011 |
| KR | 20110135408 A | 12/2011 |
| KR | 20120061881 A | 6/2012 |
| KR | 20120089861 A | 8/2012 |
| KR | 20120093415 A | 8/2012 |
| KR | 20120105936 A | 9/2012 |
| KR | 20120113801 A | 10/2012 |
| KR | 20120130291 A | 11/2012 |
| KR | 20130008468 A | 1/2013 |
| KR | 20130018051 A | 2/2013 |
| KR | 20130038044 A | 4/2013 |
| KR | 20130087973 A | 8/2013 |
| KR | 20130122986 A | 11/2013 |
| KR | 20130124351 A | 11/2013 |
| KR | 20130125058 A | 11/2013 |
| KR | 20130136932 A | 12/2013 |
| KR | 20130143618 A | 12/2013 |
| KR | 20140005899 A | 1/2014 |
| KR | 20140009995 A | 1/2014 |
| KR | 20140010021 A | 1/2014 |
| KR | 20140023419 A | 2/2014 |
| KR | 20140026576 A | 3/2014 |
| KR | 20140033657 A | 3/2014 |
| KR | 20140053331 A | 5/2014 |
| KR | 20140060210 A | 5/2014 |
| KR | 20140061449 A | 5/2014 |
| KR | 20140072185 A | 6/2014 |
| KR | 20140072904 A | 6/2014 |
| KR | 20140084024 A | 7/2014 |
| KR | 20140099893 A | 8/2014 |
| KR | 20140110922 A | 9/2014 |
| KR | 20140116704 A | 10/2014 |
| KR | 20140121391 A | 10/2014 |
| KR | 20140121830 A | 10/2014 |
| KR | 20140123001 A | 10/2014 |
| KR | 20140128968 A | 11/2014 |
| KR | 20140136995 A | 12/2014 |
| KR | 20140138300 A | 12/2014 |
| KR | 20140146113 A | 12/2014 |
| KR | 20150009538 A | 1/2015 |
| KR | 20150030197 A | 3/2015 |
| KR | 20150031242 A | 3/2015 |
| KR | 20150035556 A | 4/2015 |
| KR | 20150035760 A | 4/2015 |
| KR | 20150054669 A | 5/2015 |
| KR | 20150055115 A | 5/2015 |
| KR | 20150065231 A | 6/2015 |
| KR | 20150082696 A | 7/2015 |
| KR | 20150086445 A | 7/2015 |
| WO | 2010061724 A1 | 6/2010 |
| WO | 2010122818 A1 | 10/2010 |
| WO | 2010146975 A1 | 12/2010 |
| WO | 2013004006 A1 | 1/2013 |

OTHER PUBLICATIONS

3GPP TS 36.331 V10.0.0 (Dec. 2010), 3rd Generation Partnership Project; Technical Specification Group Radio Access Network; Evolved Universal Terrestrial Radio Access (E-UTRA); Radio Resource Control (RRC); Protocol specification (Release 10), pp. 1-276 dated 2010.

* cited by examiner

BEAMFORMING HANDOVER MESSAGING IN A WIRELESS NETWORK

CROSS-REFERENCE TO RELATED APPLICATIONS

This application is a continuation of application Ser. No. 15/229,671, filed Aug. 5, 2016, which is a continuation of application Ser. No. 14/797,134, filed Jul. 12, 2015, now U.S. Pat. No. 9,450,656, which is a continuation of application Ser. No. 14/705,497, filed May 6, 2015, now U.S. Pat. No. 9,131,414, which is a continuation of application Ser. No. 14/538,380, filed Nov. 11, 2014, now U.S. Pat. No. 9,112,556, which is a continuation of application Ser. No. 13/720,920, filed Dec. 19, 2012, now U.S. Pat. No. 8,913,593, which claims the benefit of U.S. Provisional Application No. 61/577,203, filed Dec. 19, 2011, and U.S. Provisional Application No. 61/577,206, filed Dec. 19, 2011, and U.S. Provisional Application No. 61/577,208, filed Dec. 19, 2011, which are hereby incorporated by reference in its entirety.

BRIEF DESCRIPTION OF THE SEVERAL VIEWS OF THE DRAWINGS

An exemplary embodiment of the present invention is described herein with reference to the drawings, in which.

DETAILED DESCRIPTION OF EMBODIMENTS

Example embodiments of the present invention enable beamforming information to be exchanged between base stations. Embodiments of the technology disclosed herein may be employed in the technical field of wireless communication systems. More particularly, the embodiments of the technology disclosed herein may relate to enhancing the exchange of beamforming information between base stations in a wireless communication system.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
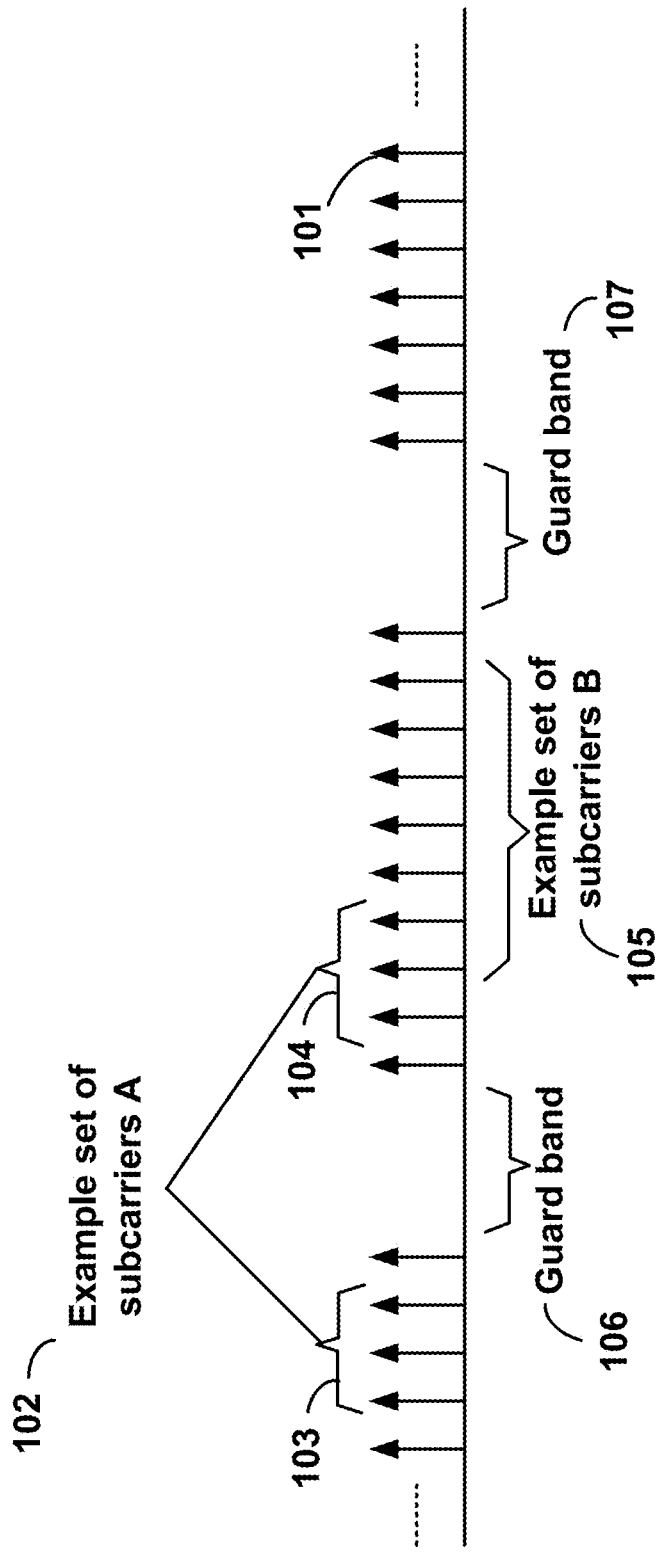
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
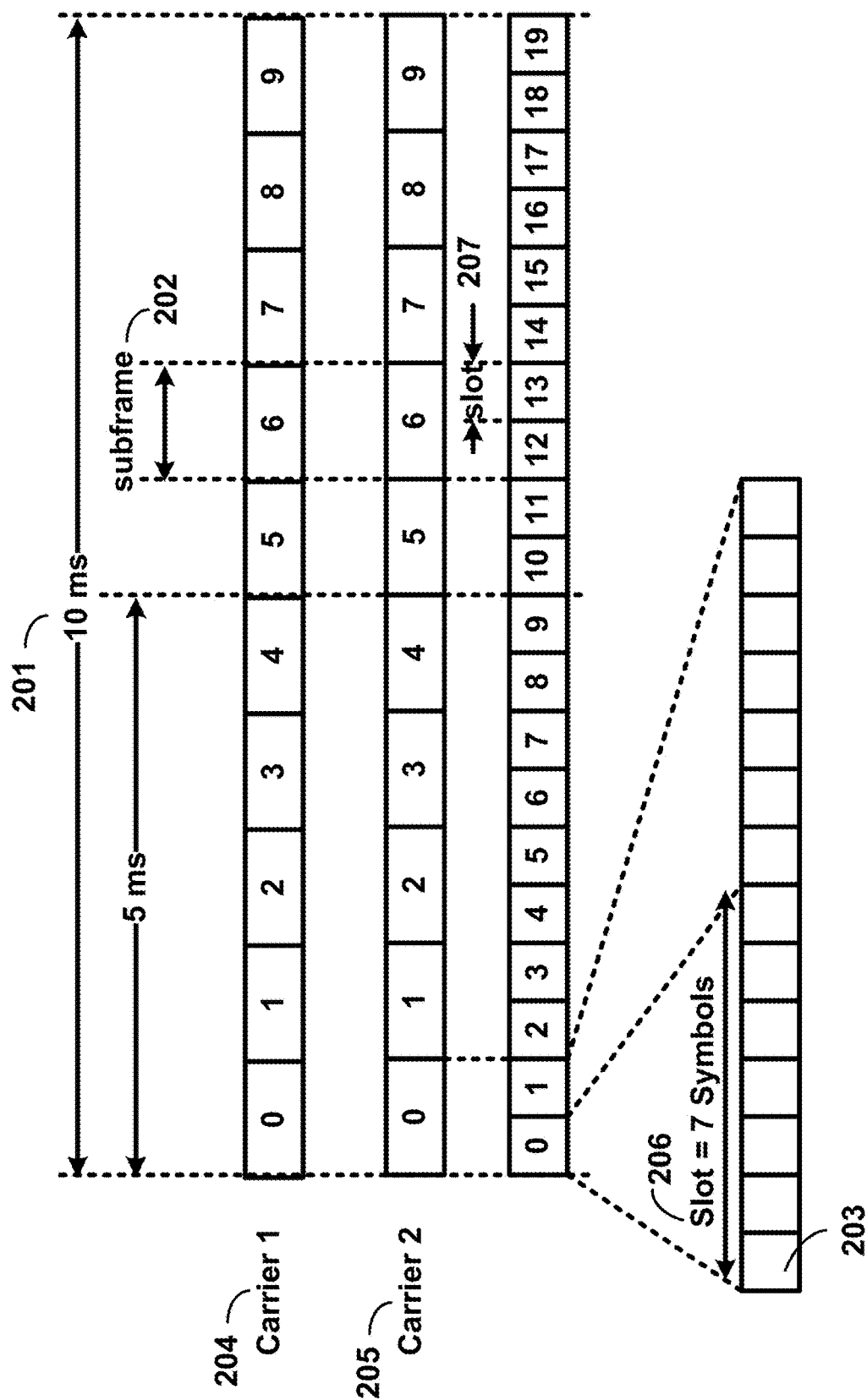
FIG. 2 is a diagram depicting an example transmission time and reception time for two carriers as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized sub-frames 202. Other subframe durations such as including 0.5 msec, 1 msec, 2 msec, and 5 msec may also be supported. Subframe(s) may consist of two or more slots 206. For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

In an example case of TDD, uplink and downlink transmissions may be separated in the time domain. According to some of the various aspects of embodiments, each 10 ms radio frame may include two half-frames of 5 ms each. Half-frame(s) may include eight slots of length 0.5 ms and three special fields: DwPTS (Downlink Pilot Time Slot), GP (Guard Period) and UpPTS (Uplink Pilot Time Slot). The length of DwPTS and UpPTS may be configurable subject to the total length of DwPTS, GP and UpPTS being equal to 1 ms. Both 5 ms and 1 ms switch-point periodicity may be supported. In an example, subframe 1 in all configurations and subframe 6 in configurations with 5 ms switch-point periodicity may include DwPTS, GP and UpPTS. Subframe 6 in configurations with 1 ms switch-point periodicity may include DwPTS. Other subframes may include two equally sized slots. For this TDD example, GP may be employed for downlink to uplink transition. Other subframes/fields may be assigned for either downlink or uplink transmission. Other frame structures in addition to the above two frame structures may also be supported, for example in one example embodiment the frame duration may be selected dynamically based on the packet sizes.

Figure 3:
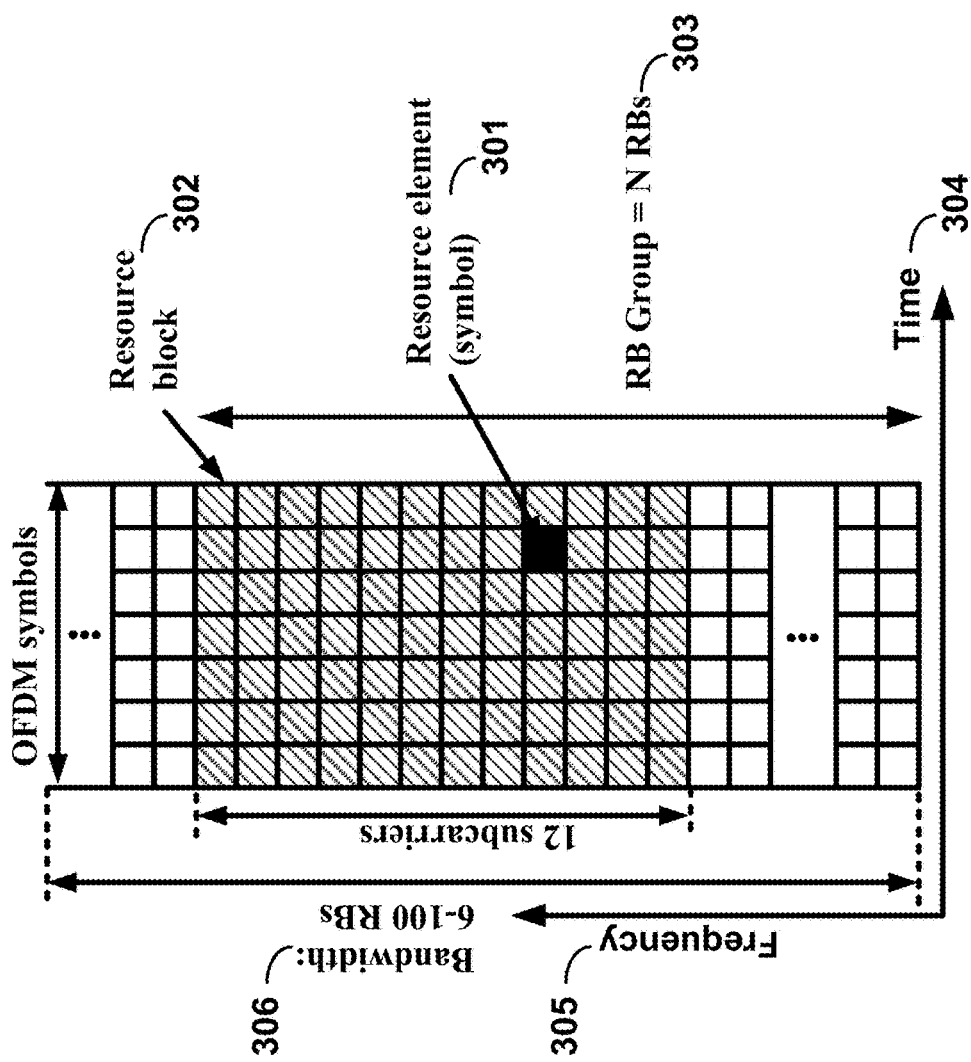
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec.

Physical and virtual resource blocks may be defined. A physical resource block may be defined as N consecutive OFDM symbols in the time domain and M consecutive subcarriers in the frequency domain, wherein M and N are integers. A physical resource block may include M×N resource elements. In an illustrative example, a resource block may correspond to one slot in the time domain and 180 kHz in the frequency domain (for 15 KHz subcarrier bandwidth and 12 subcarriers). A virtual resource block may be of the same size as a physical resource block. Various types of virtual resource blocks may be defined (e.g. virtual resource blocks of localized type and virtual resource blocks of distributed type). For various types of virtual resource blocks, a pair of virtual resource blocks over two slots in a subframe may be assigned together by a single virtual resource block number. Virtual resource blocks of localized type may be mapped directly to physical resource blocks such that sequential virtual resource block k corresponds to physical resource block k. Alternatively, virtual resource blocks of distributed type may be mapped to physical resource blocks according to a predefined table or a predefined formula. Various configurations for radio resources may be supported under an OFDM framework, for example, a resource block may be defined as including the subcarriers in the entire band for an allocated time duration.

According to some of the various aspects of embodiments, an antenna port may be defined such that the channel over which a symbol on the antenna port is conveyed may be inferred from the channel over which another symbol on the same antenna port is conveyed. In some embodiments, there may be one resource grid per antenna port. The set of antenna port(s) supported may depend on the reference signal configuration in the cell. Cell-specific reference signals may support a configuration of one, two, or four antenna port(s) and may be transmitted on antenna port(s) {0}, {0, 1}, and {0, 1, 2, 3}, respectively. Multicast-broadcast reference signals may be transmitted on antenna port 4. Wireless device-specific reference signals may be transmitted on antenna port(s) 5, 7, 8, or one or several of ports {7, 8, 9, 10, 11, 12, 13, 14}. Positioning reference signals may be transmitted on antenna port 6. Channel state information (CSI) reference signals may support a configuration of one, two, four or eight antenna port(s) and may be transmitted on antenna port(s) 15, {15, 16}, {15, . . . , 18} and {15, . . . , 22}, respectively. Various configurations for antenna configuration may be supported depending on the number of antennas and the capability of the wireless devices and wireless base stations.

According to some embodiments, a radio resource framework using OFDM technology may be employed. Alternative embodiments may be implemented employing other radio technologies. Example transmission mechanisms include, but are not limited to: CDMA, OFDM, TDMA, Wavelet technologies, and/or the like. Hybrid transmission mechanisms such as TDMA/CDMA, and OFDM/CDMA may also be employed.

Figure 4:
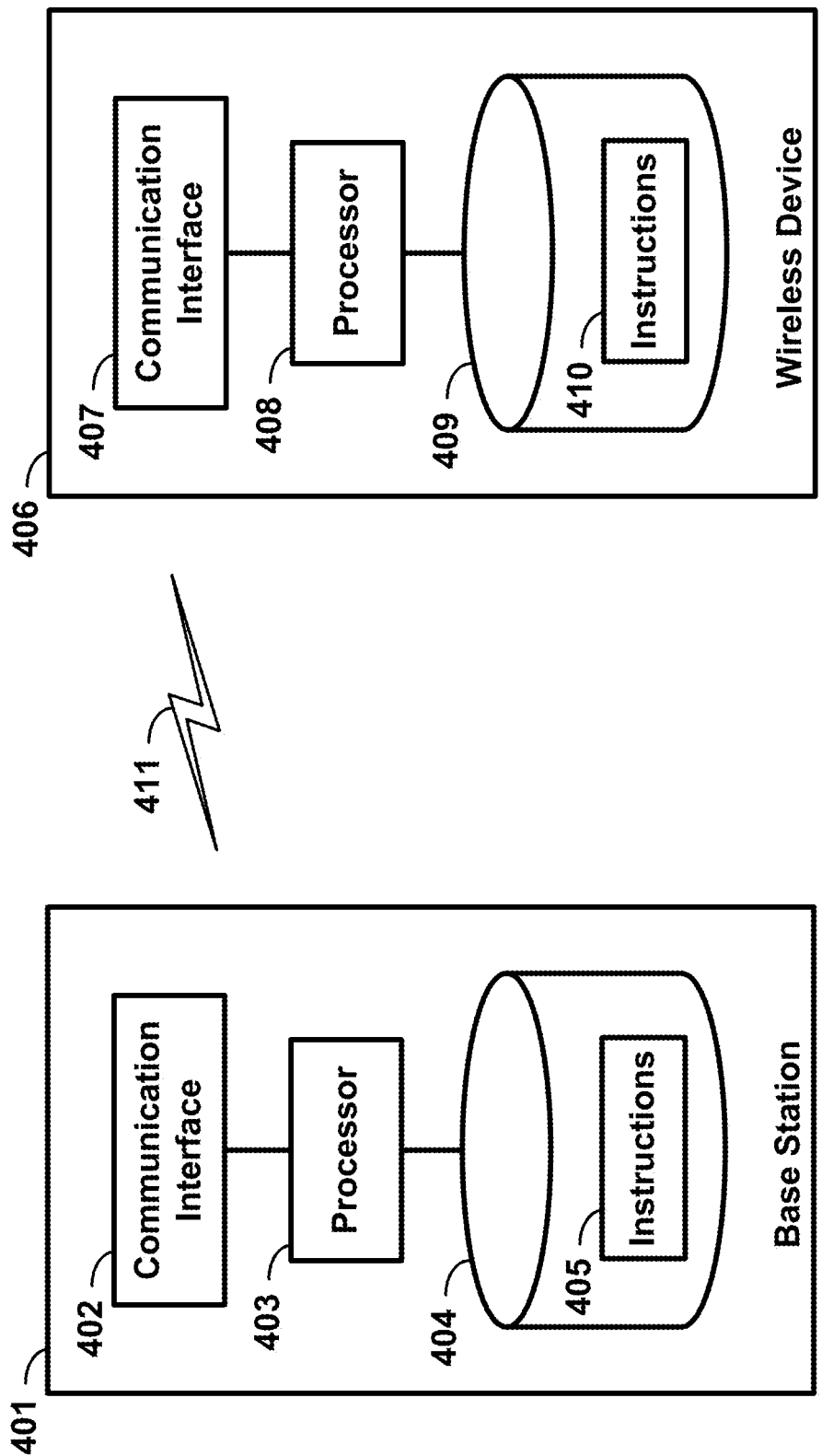
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, and FIG. 3. and associated text.

Figure 5:
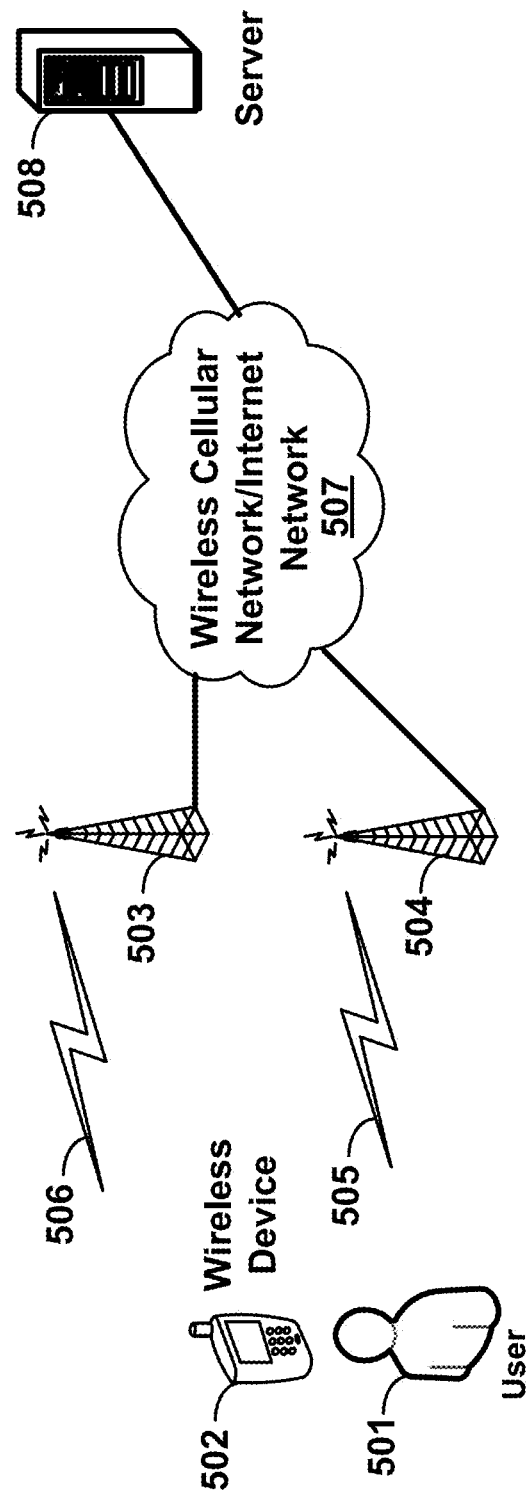
FIG. 5 is a block diagram depicting a system for transmitting data traffic over an OFDM radio system as per an aspect of an embodiment of the present invention.

FIG. 5 is a block diagram depicting a system 500 for transmitting data traffic generated by a wireless device 502 to a server 508 over a multicarrier OFDM radio according to one aspect of the illustrative embodiments. The system 500 may include a Wireless Cellular Network/Internet Network 507, which may function to provide connectivity between one or more wireless devices 502 (e.g., a cell phone, PDA (personal digital assistant), other wirelessly-equipped device, and/or the like), one or more servers 508 (e.g. multimedia server, application servers, email servers, or database servers) and/or the like.

It should be understood, however, that this and other arrangements described herein are set forth for purposes of example only. As such, those skilled in the art will appreciate that other arrangements and other elements (e.g., machines, interfaces, functions, orders of functions, etc.) may be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic in combination with hardware. For instance, various functions may be carried out by a processor executing a set of machine language instructions stored in memory.

As shown, the access network may include a plurality of base stations 503 . . . 504. Base station 503 . . . 504 of the access network may function to transmit and receive RF (radio frequency) radiation 505 . . . 506 at one or more carrier frequencies, and the RF radiation may provide one or more air interfaces over which the wireless device 502 may communicate with the base stations 503 . . . 504. The user 501 may use the wireless device (or UE: user equipment) to receive data traffic, such as one or more multimedia files, data files, pictures, video files, or voice mails, etc. The wireless device 502 may include applications such as web email, email applications, upload and ftp applications, MMS (multimedia messaging system) applications, or file sharing applications. In another example embodiment, the wireless device 502 may automatically send traffic to a server 508 without direct involvement of a user. For example, consider a wireless camera with automatic upload feature, or a video camera uploading videos to the remote server 508, or a personal computer equipped with an application transmitting traffic to a remote server.

One or more base stations 503 . . . 504 may define a corresponding wireless coverage area. The RF radiation 505 . . . 506 of the base stations 503 . . . 504 may carry communications between the Wireless Cellular Network/Internet Network 507 and access device 502 according to any of a variety of protocols. For example, RF radiation 505 . . . 506 may carry communications according to WiMAX (Worldwide Interoperability for Microwave Access e.g., IEEE 802.16), LTE (long term evolution), microwave, satellite, MMDS (Multichannel Multipoint Distribution Service), Wi-Fi (e.g., IEEE 802.11), Bluetooth, infrared, and other protocols now known or later developed. The communication between the wireless device 502 and the server 508 may be enabled by any networking and transport technology for example TCP/IP (transport control protocol/Internet protocol), RTP (real time protocol), RTCP (real time control protocol), HTTP (Hypertext Transfer Protocol) or any other networking protocol.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) belongs to only one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

Example embodiments of the invention may enable beamforming information to be exchanged between base stations. Other example embodiments may comprise a non-transitory tangible computer readable media comprising instructions executable by one or more processors to cause beamforming information to be exchanged between base stations. Yet other example embodiments may comprise an article of manufacture that comprises a non-transitory tangible computer readable machine-accessible medium having instructions encoded thereon for enabling programmable hardware to cause a device (e.g. wireless communicator, user equipment (UE), base station, etc.) to exchange beamforming information between base stations. The device may include processors, memory, interfaces, and/or the like. Other example embodiments may comprise communication networks comprising devices such as base stations, wireless devices (or UE), servers, switches, antennas, and/or the like.

According to some of the various aspects of embodiments, base stations in a wireless network may be directly or indirectly connected to each other to exchange signaling and data packets. This interface in LTE and LTE-Advanced may be called an X2 interface. Other embodiments of the interface may also possible, for example, using an S1 interface. The X2 user plane interface (X2-U) may be defined between base stations. The X2-U interface may provide non-guaranteed delivery of user plane packet date units (PDUs). The transport network layer may be built on internet protocol (IP) transport and GPRS tunneling protocol user plane (GTP-U) may be used on top of user datagram protocol (UDP)/IP to carry the user plane PDUs. The X2 control (X2-C) plane interface may be defined between two neighbor base stations. The transport network layer may be built on Stream Control Transmission Protocol (SCTP) on top of IP. The application layer signaling protocol may be referred to as X2 Application Protocol (X2-AP). A single SCTP association per X2-C interface instance may be used with one pair of stream identifiers for X2-C common procedures. A few pairs of stream identifiers may be used for X2-C dedicated procedures. The list of functions on the interface between the base stations may include the following: mobility support, load management, inter-cell interference coordination, and data exchange.

In order to establish an association between two base stations, a first base station sends a first message to a second base station to initiate an association between two endpoints. The first initiation message may comprise multiple parameters such as the following: initiate tag, advertised receiver window credit, number of outbound streams, number of inbound streams, an initial transmit sequence number, a combination thereof, and/or the like.

According to some of the various aspects of the embodiments, an initiation tag may be a 32-bits unsigned integer. The receiver of the initiation message (the responding end) may record the value of the initiate tag parameter. This value may be placed into the verification tag field of SCTP packet(s) that the receiver of the initiation message transmits within this association. In an example, the initiation tag may be allowed to have any value except zero.

According to some of the various aspects of the embodiments, the advertised receiver window credit may be a 32-bit unsigned integer. The sender of the initiation message may reserve a dedicated buffer space defined by the number of bytes in association with this window. During the life of the association, the size of this buffer space may be maintained (e.g., dedicated buffers taken away from this association); however, an endpoint may change the value of window credit it sends in a packet. The number of outbound streams may be represented by a 16-bit unsigned integer which may define the number of outbound streams the sender of the initiation message wishes to create during an association. The number of inbound streams may be represented by a 16-bit unsigned integer and may define the maximum number of streams the sender of the initiation message may allow the peer end to create during the association between the two base stations. The two endpoints may use the minimum of requested and offered parameters rather than negotiation of the actual number of streams. The initial transmit sequence number may be represented by a 32-bit unsigned integer and may define the initial transmit sequence number that the sender may use. This field, for example, may be set to the value of the initiate tag field.

According to some of the various aspects of embodiments, the second base station may transmit an initiation acknowledgement message to acknowledge the initiation of an SCTP association with the first base station. The parameter part of the initiation acknowledgement message may be formatted similarly to the initiation message. The parameter part of the initiation acknowledgement message may use two extra variable parameters: the state cookie and the unrecognized parameter. The initiate tag may be represented by a 32-bit unsigned integer. The receiver of the initiation acknowledgement message may record the value of the initiate tag parameter. This value may be placed into the verification tag field of SCTP packet(s) that the initiation acknowledgement message receiver transmits within this association. According to some of the various aspects of the embodiments, the advertised receiver window credit may represented by a 32-bit unsigned integer. This value may represent the dedicated buffer space, in terms of the number of bytes, that the sender of the initiation acknowledgement message has reserved in association with this window. During the life of the association, the size of this buffer space may be maintained (e.g. not be lessened or taken away from this association).

According to some of the various aspects of embodiments, the number of outbound streams may be represented by, for example, a 16-bit unsigned integer. The number of outbound streams may define the number of outbound streams the sender of the initiation acknowledgement message wishes to create during this association between base stations. The number of inbound streams may, for example, be a represented in terms of a 16-bit unsigned integer. It may define the maximum number of streams the sender of this initiation acknowledgement message allows the peer end to create. The two endpoints may use the minimum of requested and offered parameters, rather than negotiation of the actual number of streams. An initial transmit sequence number (TSN) may be a represented by a 32-bit unsigned integer. The initial transmit sequence number (TSN) may define the initial TSN that the initiation acknowledgement message sender may use. This field may be set to the value of the initiate tag field. The state cookie parameter may contain the needed state and parameter information required for the sender of this initiation acknowledgement message to create the association between base stations. The state cookie parameter may also include a message authentication code (MAC). An unrecognized parameter may be returned to the originator of the initiation message when the initiation message contains an unrecognized parameter that has a value that indicates it should be reported to the sender. This parameter value field may contain unrecognized parameters copied from the initiation message complete with, for example, parameter type, length, and value fields.

According to some of the various aspects of embodiments, when sending an initiation acknowledgement message as a response to an initiation message, the sender of the initiation acknowledgement message may create a state cookie and send it in the state cookie parameter of the initiation acknowledgement message. Inside this state cookie, the sender may include a message authentication code, a timestamp on when the state cookie is created, and the lifespan of the state cookie, along with the information needed for it to establish the association. The following steps may be taken to generate the state cookie: 1) Create an association transmission control block (TCB) using information from both the received initiation message and the outgoing initiation acknowledgement messages, 2) In the TCB, set the creation time to the current time of day, and the lifespan to the protocol parameter to a pre-determined number, 3) From the TCB, identify and collect the minimal subset of information needed to re-create the TCB, and generate a MAC using this subset of information and a secret key, and/or 4) Generate the state cookie by combining this subset of information and the resultant MAC.

After sending the initiation acknowledgement with the state cookie parameter, the sender may delete the TCB and any other local resource related to the new association so as to prevent resource attacks. The hashing method used to generate the MAC may be strictly a private matter for the receiver of the initiation message. The MAC may be used to prevent denial-of-service attacks. The secret key may be random. The secret key may be changed reasonably frequently, and the timestamp in the state cookie may be used to determine which key should be used to verify the MAC. An implementation of an embodiment may make the cookie as small as possible to ensure interoperability.

According to some of the various aspects of embodiments, the first base station may transmit at least one third message to the second base station. One of the at least one third message may be a cookie-echo message. The cookie-echo message may be used during the initialization of an association. It may be sent by the initiator of an association to its peer to complete the initialization process. This cookie-echo message may precede any transport packet message sent within the association and may be bundled with one or more data transport packet in the same packet. This message may contain the cookie received in the state cookie parameter from the previous initiation acknowledgement message. The type and flags of the cookie-echo may be different than the cookie parameter. Some embodiments may make the cookie as small as possible to ensure interoperability. A cookie echo may not contain a state cookie parameter, but instead, the data within the state cookie's parameter value becomes the data within the cookie echo's chunk value. This may allow an implementation of an embodiment to change the first two bytes of the state cookie parameter to become a cookie echo message. The first base station may transmit at least one application protocol message in the cookie echo message. Alternatively, an implementation option may be for the base station to transmit application protocol messages after the association is complete and to not include application protocol messages in a cookie-echo message.

The application protocol message may receive a cookie-ack message from the second base station. This application protocol message may be used during the initialization of an association. The application protocol message may also be used to acknowledge the receipt of a cookie-echo message. This application protocol message may precede other data sent within the association and may be bundled with one or more data packets in the same SCTP packet. The second base station may transmit at least one application protocol message in a cookie ack message. Alternatively, according to one embodiment, the base station may choose to transmit application protocol messages after the association is complete rather than include application protocol messages in a cookie-ack message.

After the initiation and initiation acknowledgement messages are transmitted, the first base station or the second base station may transmit an X2 setup message to cause an X2 application interface to be configured. The first base station or the second base station may wait until the association is complete to set up an X2 application interface. Either the first base station or second base station could start the setup of the X2 application. The purpose of an X2 setup procedure could be to exchange application level configuration data needed for two base stations to interoperate correctly over the X2 interface. This procedure may erase any existing application level configuration data in the two nodes and replace the application level configuration data by the one received by the X2 setup message. This procedure may also reset the X2 interface.

A first base station or second base station may initiate the X2 setup procedure by sending the X2 set up request message to a candidate base station. The candidate base station may reply with the X2 set up response message. The initiating base station may transfer the list of served cells. The candidate base station may reply with the complete list of its served cells.

Figure 11:
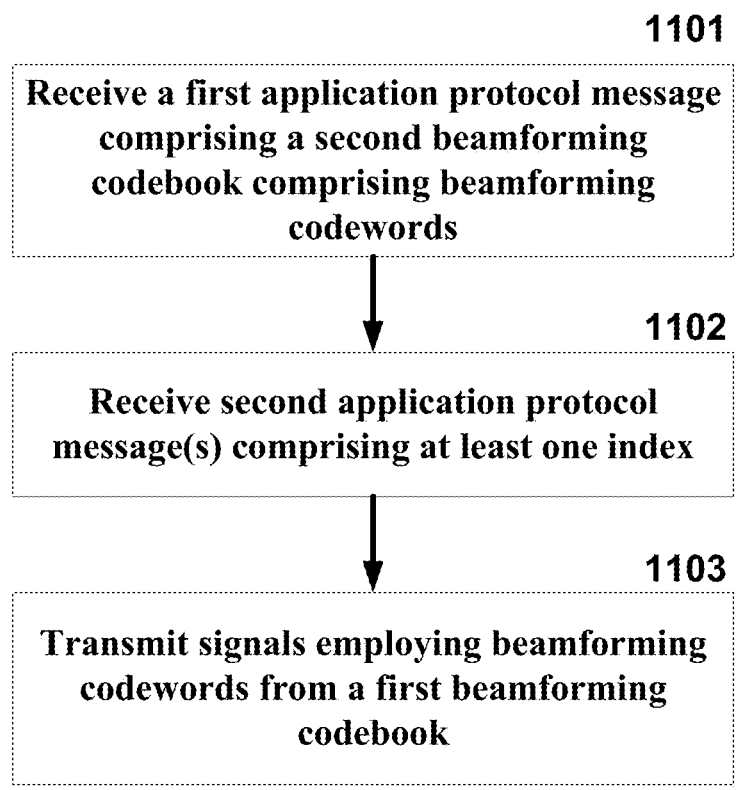
FIG. 11 depicts an example flow chart for a base station employing beamforming as per an aspect of an embodiment of the present invention.

FIG. 11 depicts an example flow chart for a base station employing beamforming as per an aspect of an embodiment of the present invention. According to some of the various aspects of embodiments, a base station may receive a first application protocol message, for example an X2 set up request message, as shown in 1101. The X2 set up request message may include the following information about the originator of the message: a global base station identifier, the information about the served cells, and a group identifier list. The group identifier list identifies the pools to which the base station belongs to. Each row in this list may include the public land mobile network (PLMN) ID and mobility management entity (MME) group identifier. The information about each served cell may include information about the served cell configurations and may also include the list of neighbor cells of the served cell including, for example: the cell global identifier of the neighbor cell, the physical cell identifier of the neighbor cell, and the frequency of the cells. The served cell information may include at least one of the following parameters: a physical cell ID, a global cell identifier, a tracking area code, at least one broadcast PLMN, frequency division duplexing (FDD) information (uplink and downlink frequencies, uplink and downlink transmission bandwidth), time division duplexing (TDD) information (transmission frequency, subframe assignment, special subframe information, special subframe pattern, cyclic prefix for downlink and uplink), number of antenna ports, physical random access channel (PRACH) configuration, multicast broadcast single frequency network (MBSFN)

subframe info (radio frame allocation period, radio frame allocation offset, subframe allocation), and a CSG identifier. The X2 set up request or some other subsequent application protocol messages may also include a beamforming codebook comprising a plurality of beamforming codewords. Each of the plurality of beamforming codewords may be identifiable by an index. In an example implementation, the codebook may be transmitted in the form of a look up table including rows, columns, and/or the like. For example, each row may include the index and the codeword corresponding to that index. A codeword in a row may be identifiable by the index in the same row. In another example implementation, the codewords in a codebook may be ordered according to their index. Identifying a codeword by an index may be performed implicitly according to codeword order or codeword ranking in a list. The indexes may or may not be included in the message transmitted on the X2 interface. The index(es) may be employed in other messages in order to refer to the codeword. In an example implementation, rows could be implemented as columns by just transposing the implemented matrix or array. It is also possible to implement a matrix, rows and/or columns of variables using various techniques such as using pointers, object oriented programming structures or other various programming structures configured to store a list of interrelated variables.

The index may be presented by a number of bits in a transmitted message between base stations or between a base station and a wireless device. The number of bits may be greater than or equal to $\log_2(N)$, N being the number of the plurality of beamforming codewords. The number of bits may be less than the number of bits in a corresponding beamforming codeword.

The first base station may receive at least one fourth message from a second base station. The at least one fourth message may comprise a second beamforming codebook comprising a second plurality of codewords. The base station may receive from a second base station, at least one second application protocol message comprising at least one index in the plurality of indexes as shown in 1102. The at least one index may identify a subset of the plurality of beamforming codewords. The first base station may transmit signals to a plurality of wireless devices employing a first plurality of beamforming codewords from a first beamforming codebook as shown in 1103. The first plurality of codewords may be selected, at least in part, employing the subset of the second plurality of beamforming codewords.

The base station may transmit signals (data and/or control packets) to a plurality of wireless devices using a first plurality of beamforming codewords from a first beamforming codebook. The first plurality of codewords may be selected based, at least in part, on information received from the other base station. The information may comprise indexes of codewords from the second beamforming codebook. In some of the various embodiments, a first base station may transmit X2 messages to cause configuration of a table of codewords in a second base station. The first base station may then refer to the index(es) in the same and/or subsequent messages to refer to a codeword(s). The process may reduce the number of bits transmitted on the X2 and/or air interfaces. In an example embodiment, a codebook may include ten codewords. (N=10). Each codeword may be a variable presented by fifty bits. The indexes may be presented by k number of bits, k being a number greater than or equal to four and less than fifty.

According to some of the various aspects of embodiments, a first base station may transmit a first message to initiate an association between the first base station and a second base station in the plurality of base stations. The first message may comprise a first initiation tag. The first base station may receive a second message from the second base station. The second message may comprise a second verification tag, a second initiation tag, and a first state parameter. The second verification tag may be equal to the first initiation tag. A first state parameter may comprise at least one parameter related to operational information of the association and a message authentication code generated as a function of a private key.

The first base station may transmit at least one third message to the second base station. The at least one third message may comprise a first verification tag, a parameter, and a first application protocol message. The first verification tag may be equal to the second initiation tag. The parameter may comprise the first state parameter. The first application protocol message may comprise a unique identifier of the first base station, at least one MME group identifier, and a first beamforming codebook. The first beamforming codebook may comprise a first plurality of beamforming codewords. Each of the first plurality of beamforming codewords may be identifiable by an index. The index may be presented by a number of bits. The number of bits may be greater than or equal to $\log_2(N)$, wherein N is the number of the plurality of beamforming codewords. The number of bits may be smaller than the number of bits in a corresponding beamforming codeword. The first base station may receive at least one fourth message from the second base station comprising an acknowledgement for the receipt of the parameter. The second base station may transmit signals to a plurality of wireless devices using a second plurality of beamforming codewords from a second beamforming codebook. The first plurality of codewords may be selected based, at least in part, on information received from the first base station. The information may comprise indices of codewords from said first beamforming codebook.

Figure 10:
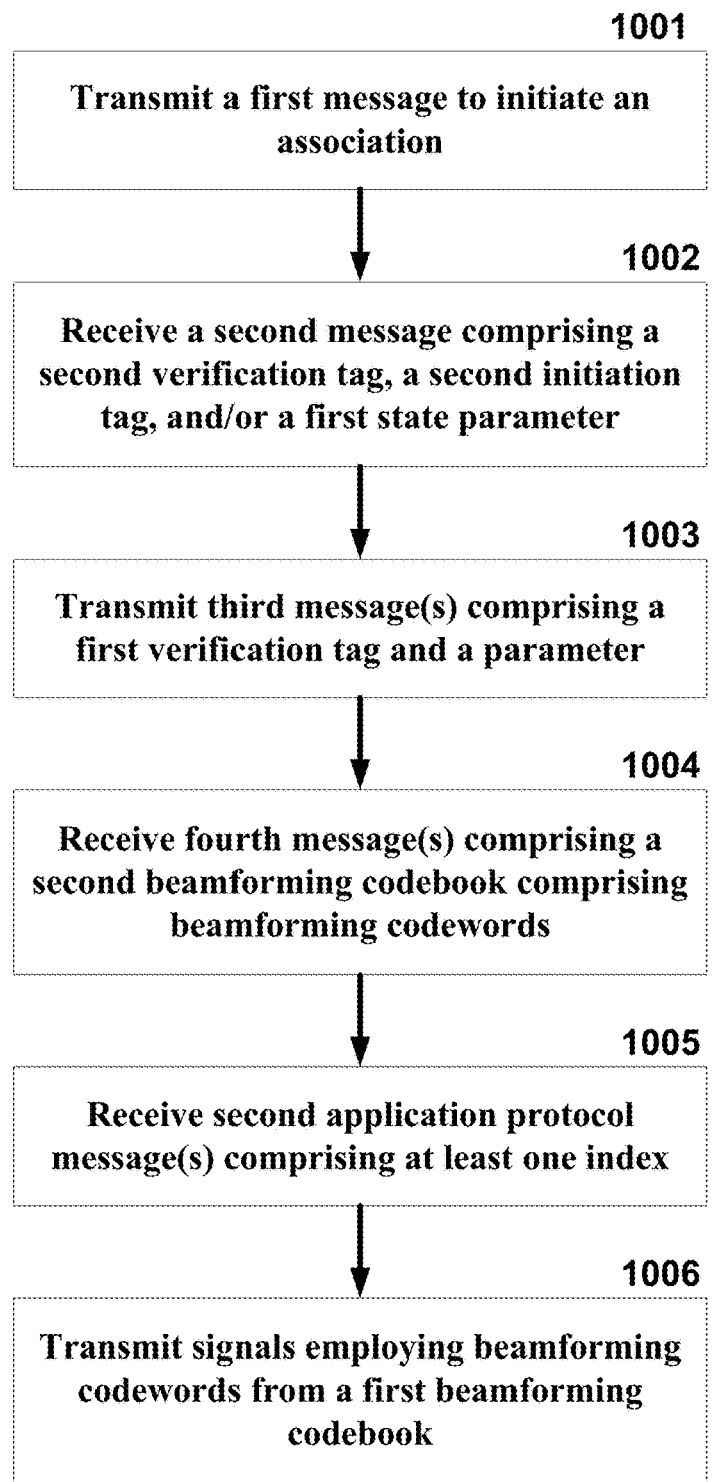
FIG. 10 depicts an example flow chart for a base station employing beamforming as per an aspect of an embodiment of the present invention.

FIG. 10 depicts an example flow chart for a base station employing beamforming as per an aspect of an embodiment of the present invention. According to some of the various aspects of embodiments, a first base station may transmit a first message to initiate an association between the first base station and a second base station in the plurality of base stations as shown in 1001. The first message may comprise a first initiation tag. The first base station may receive a second message from the second base station as shown in 1002. The second message may comprise: a second verification tag, a second initiation tag, a first state parameter, a combination thereof, and/or the like. The second verification tag may be equal to the first initiation tag. The first state parameter may comprise at least one parameter related to operational information of the association, and a message authentication code generated as a function of a private key. The first base station may transmit at least one third message to the second base station as shown in 1003. The at least one third message may comprise a first verification tag and a parameter. The first verification tag may be equal to the second initiation tag. The parameter may comprise the first state parameter.

The first base station may receive at least one fourth message from the second base station as shown in 1004. The at least one fourth message may comprise an acknowledgement for the receipt of the parameter, and a second application protocol message. The second application protocol message may comprise a unique identifier of the second base station, at least one MME group identifier, and a second beamforming codebook. The second beamforming codebook may comprise a second plurality of beamforming codewords. Each of the second plurality of beamforming codewords may be identifiable by an index. The index may be presented by a number of bits. The number of bits may be greater than or equal to $\log_2(N)$, wherein N is the number of the plurality of beamforming codewords. The number of bits may be smaller than the number of bits in a corresponding beamforming codeword. The first base station may transmit signals to a plurality of wireless devices using a first plurality of beamforming codewords from a first beamforming codebook as shown in 1006. The first plurality of codewords may be selected based, at least in part, on information received from the second base station as shown in 1005. The information may comprise indices of codewords from the second beamforming codebook.

According to some of the various aspects of embodiments, the first initiation tag value may be selected in the first base station using a pseudo-random process. The second initiation tag value may be selected in the second base station using a pseudo-random process. The first message may further comprise a first base station transport address and a second base station transport address. The first message may further comprise a first advertised receiver window credit representing a dedicated buffer space that the first base station reserves for a window of received packets from the second base station. The first message may further comprise a first initial transmission sequence number that the first base station uses for transmission of data segments. The first initial transmission sequence number may be equal to the first initiation tag.

The second message may further comprise the first base station transport address and the second base station transport address. The second message may further comprise a second advertised receiver window credit representing a dedicated buffer space that the second base station reserves for a window of received packets from the first base station. The second message may further comprise a second initial transmission sequence number that the second base station uses for transmission of data chunks. The second initial transmission sequence number may be equal to the second initiation tag. The at least one third message may further comprise the first base station transport address and the second base station transport address. The at least one third message may further comprise a transmit sequence number, a stream identifier, a stream sequence number.

The at least one fourth message may further comprise a transmit sequence number, a stream identifier, and a stream sequence number. The second base station may place the first initiation tag in the verification tag of every transport layer packet that it transmits to the first base station within the association. The first base station may place the second initiation tag in the verification tag of every SCTP packet that it transmits to the second base station within the association. The association may be an SCTP association. The at least one fourth message may further comprise the first base station transport address and the second base station transport address. The second application protocol message may be an X2-Application Protocol Setup Request message. The second application protocol message may be an X2-Application Protocol Setup Response message. The at least one third message may further comprise an X2-Application Protocol Setup Request message. The at least one third message may further comprise an X2-Application Protocol Setup Response message.

The first state parameter may further comprise a timestamp on when the first state parameter is created. The first state parameter may further comprise the lifespan of the first state parameter. The message authentication code may further be a function of at least one parameter related to operational information of the association. The at least one third message may further comprise a first application protocol message. The first application protocol message may comprise a unique identifier of the first base station, at least one MME group identifier, a beamforming codebook comprising a first plurality of beamforming codewords. Each of the first plurality of beamforming codewords may be identifiable by an index. The index may be presented by the first number of bits.

The first verification tag and the second verification tag in the association may not change during the life time of the association. A new verification tag value may be used each time the first base station or the second base station tears down and then reestablishes an association with the same node. The operational information may comprise at least one of the following: a parameter in the first message, a parameter in the second message, a state of the association, a configuration parameter of the first base station, a configuration parameter of the second base station, a combination thereof, and/or the like. The first message and the second message may further comprise a checksum for packet validation. The first base station transport address and the second base station transport address may comprise an IP address and a port address.

The first message may further comprise a first number of outbound streams that the first base station intend to create and a first maximum number of inbound streams that the first base station allows the second base station to create. The second message may further comprise a second number of outbound streams that the second base station intend to create, a second maximum number of inbound streams the second base station allows the first base station to create. The second number of outbound streams is smaller than or equal to the first maximum number of inbound streams. The first base station may further select a number equal or lower than the minimum of the first number of outbound streams and the second maximum number of inbound streams as the number of outbound streams for the first base station.

The first base station may use the plurality of indexes in communications with the second base station. Each of the plurality of indexes may refer to a locally unique beamforming codeword. The second application protocol message may further comprise the number of antennas of each cell in the second base station. The second application protocol message may further comprise a cell ID for each cell in the second base station. The second application protocol message may further comprise the frequency of each downlink and uplink carrier of the second base station. The first beamforming codebook and second beamforming codebook may be the same. The first plurality of beamforming codewords may be selected to reduce inter-cell interference from the second base station. The first base station may use information received from at least one wireless device to compute the inter-cell interference from the second base station.

The first plurality of beamforming codewords may be selected to reduce inter-cell interference to the second base station. The first base station may use information received from at least one wireless device to compute the inter-cell interference to the second base station. The first beamforming codebook or the second beamforming codebook may be defined for a maximum number of transmit antennas and comprises a set of original codewords. Each original codeword may have a number of rows or columns equal to the maximum number of transmit antennas. Codewords for a smaller number of transmit antennas may be constructed by using a subset of rows or columns of the original codewords. The first beamforming codebook or the second beamforming codebook may be defined for a maximum number of layers and may comprise a set of codewords. Each codeword may have a number rows or columns equal to the maximum number of layers. Codewords for a smaller number of layers may be constructed by using a subset of columns or rows of the original codewords.

The first base station may exchange similar messages with a plurality of second base stations. The first plurality of beamforming codewords may be selected to reduce inter-cell interference from a subset of the plurality of second base stations. The first base station may use information received from at least one wireless device to compute the inter-cell interference from the subset of the plurality of second base stations. The first plurality of beamforming codewords may be selected to reduce inter-cell interference to a subset of the plurality of second base stations. The first base station may use information received from at least one wireless device to compute the inter-cell interference to the subset of the plurality of second base stations. The second base station may transmit the same second application protocol message to a plurality of first base stations. The plurality of first base stations may select their respective first plurality of beamforming codewords based on information received from the second base station in the second application protocol message.

Figure 6:
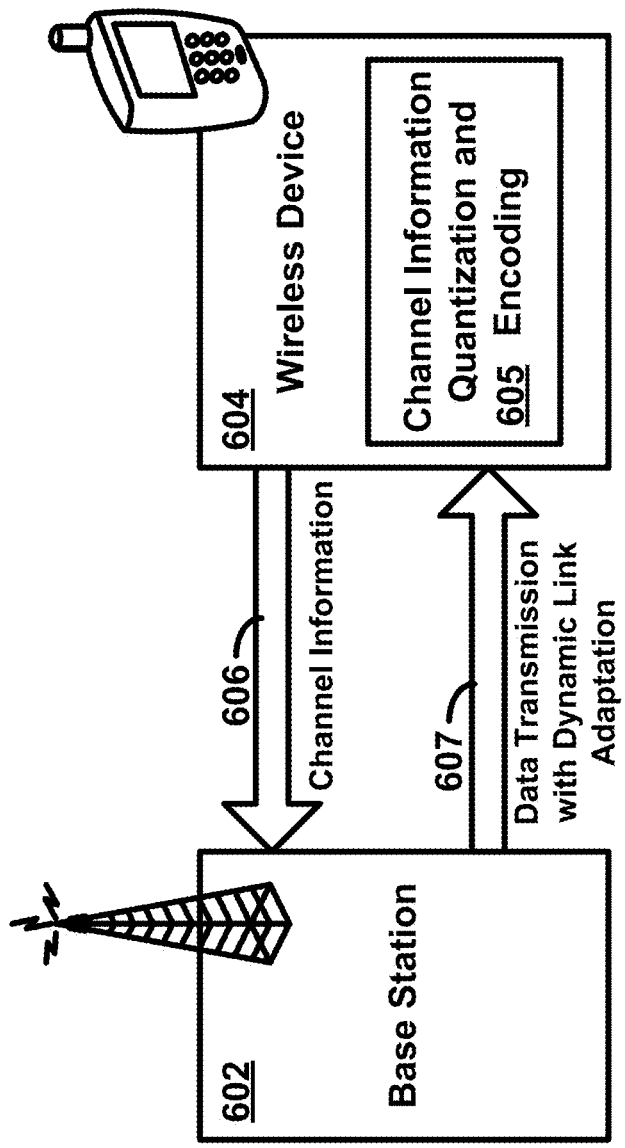
FIG. 6 is a block diagram of a limited feedback system as per an aspect of an embodiment of the present invention.

FIG. 6 is a block diagram of a limited feedback system according to an aspect of an embodiment of the present invention. Wireless device 604 measures information about a wireless channel (either perfect or imperfect) between the base station 602 transmitter and the wireless device 604 receiver. This receiver channel information may be fed into a quantizer/encoder 605 that returns a small number of feedback bits to be sent as overhead on reverse link 606. The base station 602 transmitter may use the received feedback bits to adapt the transmitted signal to forward channel 607.

The limited feedback may be implemented in multiple antenna wireless systems. Limited feedback may be a viable and beneficial option for a system that adapts a spatial degree-of-freedom. The degrees of freedom with multiple antenna systems may be exploited to offer rate and diversity benefits as well as beamforming and interference canceling capabilities. While the diversity gain may be extracted without the need of channel state information at the transmitter (CSIT) feedback (e.g., space time codes), CSIT may play a role for beamforming and interference mitigation at the transmitter.

A single-user narrowband multiple antenna system may be represented by an expression of the form $y[k]=H[k]x[k]+n[k]$ at the k-th channel. Assuming $M_t$ transmit antennas and $M_r$ receive antennas, $y[k]$ may be an $M_r$-dimensional receive vector, $H[k]$ may be an $M_r \times M_t$ channel response matrix, $x[k]$ may be an $M_t$-dimensional transmit vector, and $n[k]$ may be $M_r$-dimensional noise. The noise may be assumed to have independent and identically distributed (iid) normalized entries distributed according to $CN(0, 1)$. As in the single antenna case, the scenario where the receiver has access to $H[k]$ may be considered. Given this, there may be a variety of ways to design $x[k]$ if the transmitter is given access to some quantized information relating to $H[k]$. Again, this analysis may depend on the time evolution model of the channel. If we use notation of block-fading, the tth channel block may satisfy $H[tKch]=H[tKch+1]=\ldots=H[(t+1)Kch-1]=H(t)$ where Kch is the length of the fading block.

When the transmitter and receiver both know the channel, the ergodic capacity may be $$R = E_H[_{Q:tr(Q)\leq 1, Q^*=Q, Q\geq 0}^{max} \log_2 \det(I + \rho H Q H^*)].$$

Here, Q may be the covariance of the transmitted signal for each individual instantaneous channel realization. The covariance of the transmitted signal may incorporate both the spatial power allocation as well as unitary precoding. Spatial power allocation may be needed for cases when the number of transmit antennas is greater than the number of receive antennas. From an encoding point of view, $x[k]=\sqrt{\rho}(Q[k])^{1/2}s[k]$, $k=0, \ldots, K_{bl}-1$ where $Q[k]$ may solve the optimization (based on channel feedback)

$$Q[k] = _{Q:tr(Q)\leq 1, Q^*=Q, Q\geq 0}^{argmax} \log_2 \det(I + \rho H Q H^*).$$

and $s[k]$ may the k-th channel use of an open-loop codeword.

For a limited rate feedback approach, the general idea may be to use the fact that the receiver knows $H[k]$ through procedures such as training. Using this channel knowledge, the receiver may quantize some function of $H[k]$ using vector quantization (VQ) techniques.

Naturally, the aspects of the channel that the transmitter cares about are those that allow the design of the covariance for the $t^{th}$ channel block. Using this line of reasoning, the receiver may determine a rate maximizing covariance and feed this back to the transmitter. Employing a codebook of possible covariance matrices $Q=\{Q_1, \ldots, Q_{2^B}\}$ that may be known to the transmitter and receiver, the receiver may search for the codebook index.

The covariance codebook may be either fixed or randomly generated (using a seed known to both the transmitter and receiver). Designing a fixed covariance codebook to maximize the average rate may be a challenging problem that depends on the stationary distribution of the channel. Vector quantization approaches may efficiently generate codebooks that achieve a large rate. Random approaches for a covariance design may also be possible. The rate loss with B bits of feedback may decrease with the number of feedback bits.

While the codebook approach may be used for a block-to-block independently fading channel, temporal correlation between channel realizations may improve quantization. Feedback approaches based on tracking the channel using gradient analysis may also be possible. The use of switched codebooks, where the codebook is changed or adapted over time may be implemented. Orientation and radius of a localized codebook cap changing over time may be implemented with beamforming codebooks which have adaptive localized codebook caps. Models may be used to implement feedback compression. For example, Markov chain compression may be employed to analyze the effects of feedback delay and channel time evolution.

In an example embodiment, beamforming may be characterized by the use of a rank one covariance matrix. Using a rank one Q matrix may be useful whenever the single-user channel is itself rank one. This may occur when the user terminal is equipped with a single antenna. In this situation, the availability of CSIT may be needed.

In beamforming, the single-user multiple input multiple output (MIMO) expression in $y[k]=H[k]x[k]+n[k]$ may be restricted so that $x[k]=\sqrt{\rho}f[k]s[k]$ where $f[k]$ is a channel dependent vector referred to as a beamforming vector and $s[k]$ is a single-dimensional complex symbol chosen independently of instantaneous channel conditions. In the multiple input single output (MISO) case, there may be a single receive antenna. In this case, y[k] may be reformulated as $y[k]=\sqrt{\rho}h^T[k]f[k]s[k]+n[k]$. $h[k]$ may be a column vector. With this configuration, the receive SNR at channel use k (averaged with respect to the transmitted signal and noise) may be given by $SNR[k]=\rho|h^T[k]f[k]|^2$.

For MIMO beamforming and combining, a receive-side combining vector z[k] (sometimes, but not necessarily, unit norm) may be used so that after processing $y[k]=\sqrt{\rho}z^*[k]H[k]f[k]s[k]+z^*[k]n[k]$. Conjugate transpose is denoted by *. Various forms of combiners may be implemented.

The receiver may be allowed to send some feedback to assist the transmitter's configuration. An example form of this feedback may select a transmit antenna(s). In this scenario, the transmit beamforming vector may be restricted such that one entry is non-zero. With this kind of set-up in a MISO system, a solution may be to send data on the antenna that substantially maximizes the receiver SNR, meaning data (and power) may be sent on antenna $m_{opt}[k]=\operatorname*{argmax}_{1\leq m\leq M_t}|h_m[k]|^2$ $h_m[k]$ may denote the $m^{th}$ antenna entry of the channel vector h[k]. Using this approach, the selected antenna may be configured at the receiver and may be sent back to the transmitter using $\lceil\log_2(M_t)\rceil$ bits. Error rates with antenna selection for spatially uncorrelated set-ups may be considered.

Antenna selection may be limited in terms of its benefits to the overall capacity as it may not allow for the full beamforming gain. If there exists a feedback link, more complicated forms of channel dependent feedback may improve performance. The channel vector may be quantized for a MISO system into a set of normalized column vectors={$h_1, \ldots, h_{2^B}$}. Because the system may have a single receive antenna, the channel vector h[k] may be quantized over this set by selecting the codebook vector $h_{n_{opt}}[k]$ using a phase invariant distortion such that $$n_{opt}[k] = \operatorname*{argmax}_{1\leq m\leq 2^B}|h_n^*h[k]|^2.$$

The transmitter can then pick a beamforming vector that solves $$f[k] = \operatorname*{argmax}_{f:\|f\|=1}\log_2(1+\rho|h_{n_{opt}[k]}^T f|^2) = \frac{(h_{n_{opt}[k]}^T)^*}{\|h_{n_{opt}[k]}^T\|_2}.$$

Equal gain approaches that attempt to co-phase the signals received from various antennas may be implemented. This concept may be implemented to quantize the phases of each $h_m[k]$, m=1, ..., $M_t$, using uniform phase quantization on a unit circle.

The codebooks may allow the receiver to directly configure the beamforming vector and send this vector back to the transmitter. In one example embodiment, beamforming vector quantization may be considered rather than channel quantization. f[k] may be restricted to lie in a set or codebook F={$f_1, \ldots, f_{2^B}$}. The receiver may use its channel knowledge to pick the required vector from the codebook.

Figure 7:
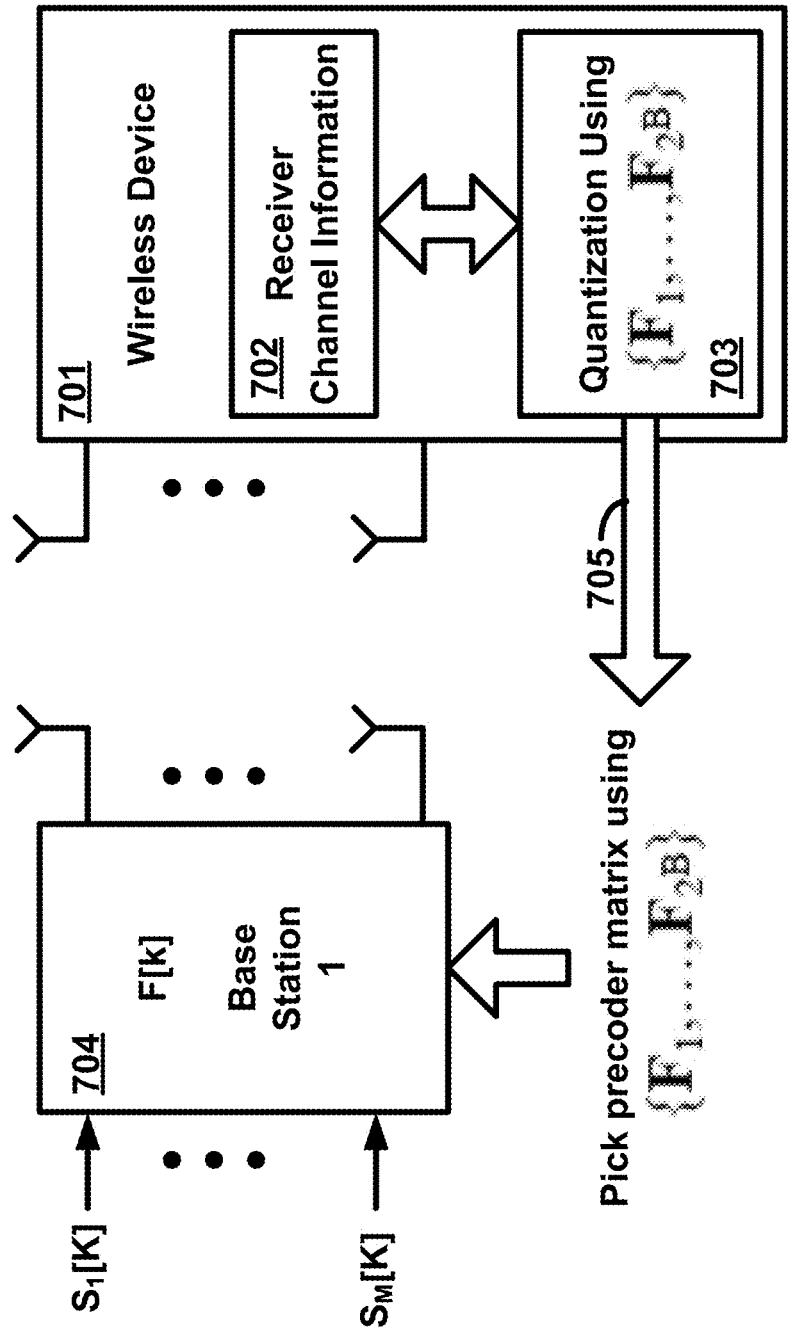
FIG. 7 is a block diagram of a limited feedback MIMO system as per an aspect of an embodiment of the present invention.

This kind of approach is demonstrated in FIG. 7 using the interpretation that beamforming may be rank one precoding. FIG. 7 is a block diagram of a limited feedback linear precoded MIMO system according to an embodiment. The receiver 702 in wireless device 701 may use a channel estimate to pick the optimal transmitter-side linear precoder from a codebook known to the transmitter and receiver. The wireless device 701 may use quantization 703 to calculate feedback. For a codebook of size $2^B$, the B-bit binary label of the chosen precoder may be sent over feedback channel 705 to base station 704. Note that the rate and/or SNR may also be known as side information to facilitate communication and may be fed back to the base station.

The receiver now, in some sense, may control how the signal is adapted to the channel. Phase quantization codebooks may be implemented for MIMO beamforming and combining. This may jointly quantize the phases across transmit antennas and implement diversity. While equal gain approaches may be an option, a general design framework may be useful. Determining favorable configuration parameters for a spatially uncorrelated Rayleigh fading channel may be a goal for outage minimizing, SNR maximizing, rate maximizing, a combination thereof, and/or the like.

For a channel, the maximum diversity order may be when the rank of the matrix [$f_1, \ldots, f_{2^B}$] constructed from the set of beamforming vectors has a rank of $M_t$. Receiver SNR degradation may be analyzed. Insights from the problem of Grassmannian line packing designs may be used to assist analysis. Closed-form integral expressions may be obtained by modeling the feedback problem as one of a correlated antenna selection. An alternative approach to Grassmannian codebooks may be to construct the codebooks using vector quantization (VQ) techniques. A distortion function (usually related to rate loss or SNR loss) may be formulated and the distortion function may be iteratively minimized to obtain local solutions. Using multiple iterations with different (possibly randomized) initial settings may yield an approximately optimal codebook. Because of the unit vector constraints on the beamforming vector set, this may be a problem in spherical vector quantization. VQ designs also may have useful analytical properties when the codebook size (or quantizer resolution) increases. High resolution analysis and codebook design may be leveraged to give new insight into codebook behavior.

Grassmannian and VQ limited feedback designs may assume codebooks that are fixed and do not vary as the channel changes. Another implementation may be to randomly generate the codebook at each block (with the randomly generated codebook known to both the transmitter and receiver). This sort of codebook design technique may be based on random vector quantization (RVQ). The idea here is to generate the $2^B$ codebook vectors independently and all identically distributed according to the stationary distribution of the quantized beamforming vector.

For example, a MISO system with channel information at the transmitter and receiver may use a beamforming vector $$f[k] = \frac{(h^T[k])^*}{\|h[k]\|_2}$$

(known as maximum ratio transmission). When the channel distribution is a spatially uncorrelated Rayleigh, the vector may follow a uniform distribution on the unit sphere. Thus, the RVQ codebook may be constructed by taking $2^B$ independently and uniformly generated points on the unit sphere. These kinds of codebooks may have very asymptotic properties as the number of antennas scales to infinity. Closed-form analysis may also be possible when the channel follows a spatially uncorrelated Rayleigh model. Several other codebook designs may be considered as alternatives to Grassmannian line packings, vector quantization, and RVQ. Equiangular frame based codebooks may be implemented based on the observation that (in the real case) codebooks from equiangular frames maximize the mutual information between the true beamforming vector and the quantized precoding vector. In certain cases Grassmannian line packing may lead to equiangular frames. Codebooks may be generalized based on the Fourier concept for limited feedback. The key idea is to recognize that the non-coherent MIMO space-time code design problem may also be the problem of finding packings on the Grassmann manifold. DFT codebooks may introduce additional structure in Fourier codebooks, further simplifying their design. Adaptive modulation may be combined with beamforming codebooks. Techniques for dealing with time variation of the channel during the feedback phase may be considered in an example implementation.

Fourth generation (4G) and beyond cellular standards may use MIMO-OFDM technology. Generalizing the input-output relation to MIMO for the $v^{th}$ subcarrier yields $\tilde{y}_v[\tilde{k}] = \tilde{H}_v[\tilde{k}] \tilde{x}_v[\tilde{k}] + \tilde{n}_v[\tilde{k}]$ for OFDM channel use $\tilde{k}$. In the formula, $\tilde{y}_v[\tilde{k}]$ is an $M_r$-dimensional received signal for subcarrier v, $\tilde{H}_v[\tilde{k}]$ is an $M_r \times M_t$ channel realization (in the frequency domain) for the $v^{th}$ subcarrier, $\tilde{x}_v[\tilde{k}]$ is an $M_t$-dimensional transmitted signal for subcarrier v, and $\tilde{n}_v[\tilde{k}]$ is $M_r$-dimensional normalized additive noise with iid CN(0, 1) entries.

MIMO channel adaptation may be done on a per-subcarrier basis. For example, a linear precoded spatial multiplexing system may set $\tilde{x}_v[\tilde{k}] = \sqrt{\rho_v} \tilde{F}_v[\tilde{k}] \tilde{s}_v[\tilde{k}]$, where $\rho_v$ is the SNR on subcarrier v, $\tilde{F}_v[\tilde{k}]$ is the $M_t \times M$ precoder on subcarrier v, and $\tilde{s}_v[\tilde{k}]$ is an M-dimensional transmitted spatial multiplexing vector. The precoder $\tilde{F}_v[\tilde{k}]$ may be adapted directly to $\tilde{H}_v[\tilde{k}]$.

MIMO-OFDM feedback systems may send feedback for pilot subcarriers $v_0, \ldots, v_{K_{pilot}-1}$ where $K_{pilot}$ is a function of the number of pilots. For example, a precoding system using limited feedback with a common codebook for all pilots of $F=\{F_1, \ldots, F_{2^B}\}$ may send B bits for each pilot subcarrier for a total feedback load of $BK_{pilot}$ bits per channel block. Given this information, the precoders for non-pilots may be determined.

It may be possible to weight and sum together the feedback beamforming vectors from the two nearest pilots. The weights may be configured to maximize the receive SNR of the subcarrier halfway between the two pilots. A transform domain quantization approach may be implemented. The precoder interpolation problem may be formulated as a weighted least squares problem. The weights may correspond to the distance (in number of subcarriers) from different pilot precoders. The technique may be generalized to larger rank precoding interpolation techniques. A geodesic approach (i.e., linear interpolation on the Grassmann manifold) may also be used. Other interpolation ideas may also be available. Instead of trying to interpolate, another implementation may be based on, where a common precoder is chosen for several contiguous subcarriers. The clustering implementation may yield an antenna subset selection criterion when the cluster is extended to cover all or most subcarriers (i.e., only one pilot) and the precoding codebook has the $$\binom{M_t}{M}$$

antenna subset matrices.

The transmitter may recreate precoders employing precoder feedback sent on a subset of the subcarriers in conjunction with the channel correlation in the frequency domain. Clustering may also be implemented. In this case, the transmitter and receiver may divide (or cluster) the subcarriers in a predetermined way. All narrowband channels within the cluster may use the same feedback and use the same precoding matrix. The receiver may then design the feedback to choose a precoder that is mutually beneficial (e.g., with respect to sum rate).

Alternative techniques besides clustering and interpolation may also be implemented. For example, Trellis techniques for precoder interpolation may be used. Successive beamforming taking into account correlation in time and frequency may be implemented. A reduced CSI feedback approach for MIMO-OFDM may take into account that highly correlated channels may have highly correlated feedback values; thus, the number of bits may be effectively reduced by taking the actual correlation between binary sequences into account.

The multi-mode precoding implementations may also be quantized. In this scenario, both the matrix and the rank of the matrix may evolve over the OFDM symbol subcarriers. An interpolation framework for multi-mode precoding may be used.

3GPP LTE and LTE-advanced may employ a MIMO-OFDMA physical layer on the downlink and may support various single and multiple user MIMO modes of operation. Several different single-user codebook based limited feedback techniques may be used. Codebook based precoding on the downlink may be implemented, for example, with two, four, or eight transmit antennas. In the case of two antennas, a beamforming codebook with six vectors (including two corresponding to antenna selection) and a precoding codebook with three matrices may be implemented. For four antennas, a four bit codebook may be used for beamforming and precoding with two, three, and four streams. The precoding codebooks may be built by taking specific subsets of Householder reflection matrices generated from the beamforming entries. The subsets may be chosen to have a nested structure. For example, for a given generating vector, the two stream codebook may include the original vector and an additional vector. The three stream codebook may add an additional vector and so on. This may facilitate multi-mode rank adaptation where the base station may change the number of active streams, and may offer some computational savings.

3GPP codebooks may use a finite alphabet structure, which may make them easy to store and may simplify computation.

A second base station may transmit to a first base station a load indication message. The load indication message may be transmitted periodically or regularly as needed. The first base station may request a load indication message and indicate the transmission period and duration. The load indication message may comprise at least one of the following fields: an uplink interference overload, an uplink high interference indication, a transmit power parameter, and an almost blank subframe. The transmitter of a load indication message may request a similar or different load indication message from the base station receiving the message. The invoke indication in the message may indicate which type of information a base station requesting the other base station may send back. A base station MAC and physical layer may schedule and transmit downlink packets based, at least in part, on the received load indication messages.

An uplink interference overload for the uplink carrier may indicate the status of uplink interference. The uplink carrier may comprise a plurality of uplink resource blocks. The uplink interference overload may indicate a status of uplink interference for each uplink resource block in the plurality of uplink resource blocks. The status of uplink interference may be represented as one of a plurality of predefined interference level indicators. The uplink high interference indication may comprise a list of a target carrier identifier and a status of uplink target interference. The status of uplink target interference may indicate the status of uplink target interference for each resource block in the plurality of uplink resource blocks. The status of uplink target interference may indicate a high interference sensitivity and/or low interference sensitivity.

Figure 12:
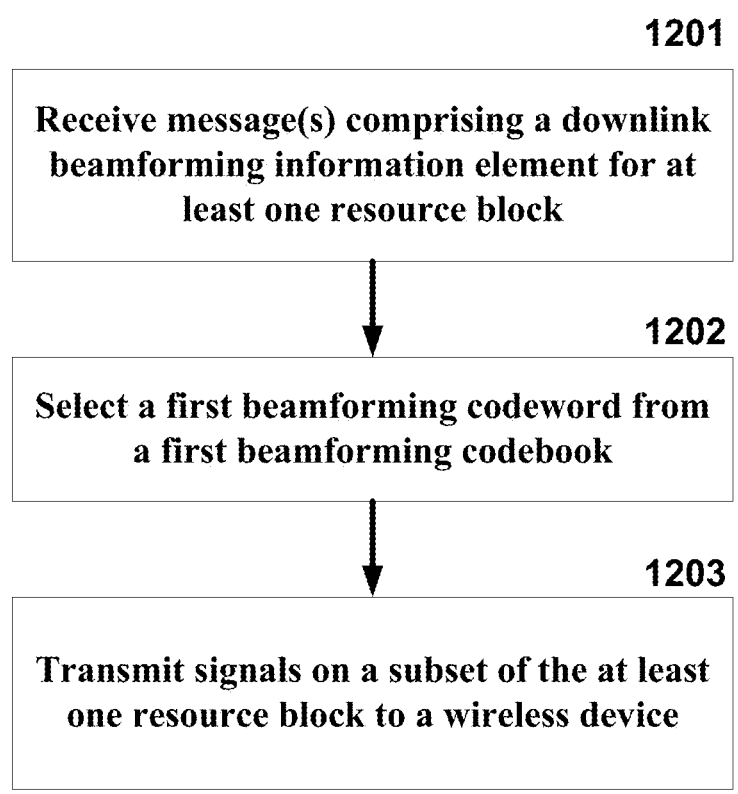
FIG. 12 depicts an example flow chart for a base station employing beamforming as per an aspect of an embodiment of the present invention.

The transmit power parameter for the downlink carrier may comprise a status of transmit power for each downlink resource block, the number of antenna ports for the downlink carrier, PDCCH information, beamforming information, a combination thereof, and/or the like. The status of transmit power for downlink resource block(s) may indicate a status of transmit power for downlink resource block(s) in the plurality of downlink resource blocks. The status of transmit power for a downlink resource block may be one of a first value when transmit power of the downlink resource block is below a pre-defined threshold and a second value when transmit power of the downlink resource block is below or above the pre-defined threshold. The PDCCH interference impact may be presented by predicted number of occupied PDCCH OFDM Symbols. The PDCCH interference impact may be one of 0, 1, 2, 3, and 4, wherein value 0 indicates no prediction is available for load information transmission;

FIG. 12 depicts an example flow chart for a base station employing beamforming as per an aspect of an embodiment of the present invention. According to some of the various aspects of embodiments, a first base station may receive from a second base station at least one application protocol message as shown in 1201. The at least one application protocol message may be received, for example from an X2 interface or an S1 interface. The first base station and the second base station may be configured to communicate with a plurality of wireless devices employing a downlink carrier. The downlink carrier may comprise a plurality of resource blocks. The at least one application protocol message may comprise a downlink beamforming information element for at least one resource block in the downlink carrier. In another implementation at least one application protocol message may comprise a plurality of downlink or uplink beamforming information elements, each one for one or more resource blocks.

The downlink beamforming information element may indicate a second beamforming codeword employed by the second base station for the at least one resource block. In another example implementation the downlink beamforming information element may indicate a plurality of second beamforming codeword employed by the second base station for the at least one resource block. The codewords are employed for beamforming. In an example implementation, the second beamforming codeword may have a number of rows or columns equal to a number of antenna ports employed by the second base station for beamforming on the downlink carrier. As described previously, an array/matrix may be stored using multiple programming code structures. The number of rows or columns refers to the information in a codeword which can be stored using various methods. In another example embodiment second beamforming codeword may have a number of rows or columns less than a number of antenna ports employed by the second base station for beamforming on the downlink carrier The second beamforming codeword may be included in (be a part of) a second beamforming codebook. In an example implementation, the second beamforming codeword may be referenced by an index. Instead of transmitting an entire codeword, the index for the codeword may be transmitted. Correspondence between the beamforming codeword and the index may be defined by an application protocol message. The application protocol message may be received prior to the at least one application protocol message reception.

The first base station may select for the at least one resource block, a first beamforming codeword from a first beamforming codebook as shown in 1202. The selection may be based, at least in part, on the downlink beamforming information element received from the second base station. The first base station may transmit, employing the first beamforming codeword, signals on a subset of the at least one resource block to a wireless device as shown in 1203. The signals may carry control or data packets for one or more wireless devices.

According to some of the various aspects of embodiments, a first base station may receive from a second base station at least one application protocol message. The first base station and the second base station may be configured to communicate with a plurality of wireless devices employing a downlink carrier. The downlink carrier may comprise a plurality of resource blocks. The at least one application protocol message may comprise a downlink beamforming information element for at least one resource block in the downlink carrier. The downlink beamforming information element may indicate a second beamforming codeword employed by the second base station for the at least one resource block. The second beamforming codeword may be referenced by an index. The second beamforming codeword may be included in a second beamforming codebook.

The first base station may select for the at least one resource block, a first beamforming codeword from a first beamforming codebook. The selection may be based, at least in part, on the downlink beamforming information element received from the second base station. The first base station may transmit, employing the first beamforming codeword, signals on a subset of the at least one resource block to a wireless device. The signals may carry control or data packets for one or more wireless devices.

The at least one application protocol message may be transmitted periodically. At least one application protocol message may further comprise a load indication message. At least one application protocol may comprise a transmit power parameter for the downlink carrier. The transmit power parameter may comprise a status of transmit power for each downlink resource block in the plurality of downlink resource blocks. The status of transmit power for a downlink resource block may be one of a first value when transmit power of the downlink resource block is below a pre-defined threshold and a second value when transmit power of the downlink resource block is below or above the pre-defined threshold.

The subset of the plurality of downlink resource blocks may be selected based, at least in part, on the transmit power parameter and the downlink beamforming information. The first beamforming codebook and second beamforming codebook may be the same. The first plurality of beamforming codewords may be selected to reduce inter-cell interference from the second base station. The first base station may use information received from at least one wireless device to compute the inter-cell interference from the second base station. The first base station may use a zero-forcing criterion to select a subset of the first plurality of beamforming codewords. The first base station may use a minimum mean squared error criterion to select a subset of the first plurality of beamforming codewords. The first plurality of beamforming codewords may be selected to reduce inter-cell interference to the second base station.

The first base station may use information received from at least one wireless device to compute the inter-cell interference to the second base station. The first base station may use a maximum signal to leakage ratio criterion to select a subset of the plurality of beamforming codewords. One skilled in the art may use other criterions. The first beamforming codebook or the second beamforming codebook may be defined for a maximum number of transmit antennas and may comprise a set of original codewords. Each original codeword may have a number rows equal to the maximum number of transmit antennas. Codewords for a smaller number of transmit antennas may be constructed by using a subset of rows of the original codewords. The first beamforming codebook or the second beamforming codebook may be defined for a maximum number of layers and may comprise a set of original codewords. Each original codeword may have a number columns (or rows) equal to the maximum number of layers. Codewords for a smaller number of layers may be constructed by using a subset of columns (or rows) of the original codewords. The first base station may receive similar application protocol messages from a plurality of second base stations.

The first plurality of beamforming codewords may be selected to reduce inter-cell interference from a subset of the plurality of second base stations. The first base station may use information received from at least one wireless device to compute the inter-cell interference from the subset of the plurality of second base stations. The first base station may use a zero-forcing criterion to select a subset of the first plurality of beamforming codewords. The first base station may use a minimum mean squared error criterion to select a subset of the first plurality of beamforming codewords. The first plurality of beamforming codewords may be selected to reduce inter-cell interference to a subset of the plurality of second base stations. The first base station may use information received from at least one wireless device to compute the inter-cell interference to the subset of the plurality of second base stations. The first base station may use a maximum signal to leakage criterion to select a subset of the first plurality of beamforming codewords. The second base station may transmit the same second application protocol message to a plurality of first base stations. The plurality of first base stations may select their respective first plurality of beamforming codewords based on information received from the second base station in the second application protocol message.

Figure 8:
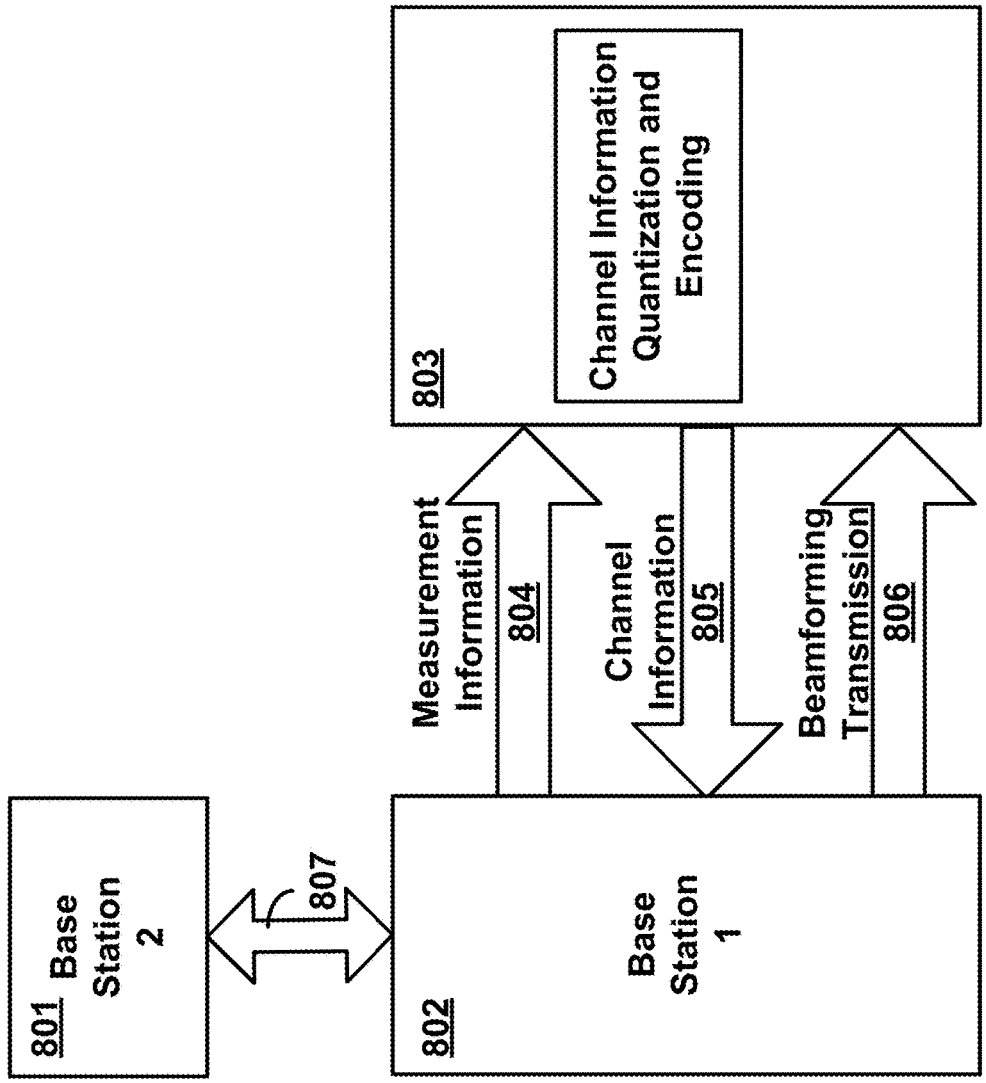
FIG. 8 is a block diagram for beamforming information exchange as per an aspect of an embodiment of the present invention.

FIG. 8 is a block diagram for beamforming information exchange according to at least one embodiment. In an example embodiment, a first base station 802 may comprise a communication interface, a processor, and a memory storing instructions that, when executed, cause the first base station to cause certain functions. The first base station 802 may receive at least one application protocol message from a second base station 801 using interface 807. The second base station 801 may comprise a downlink carrier comprising a plurality of downlink resource blocks. The at least one application protocol message may comprise downlink beamforming information for the downlink carrier. The downlink beamforming information may indicate, for each downlink resource block in the plurality of downlink resource blocks, a beamforming codeword employed for the downlink resource block. The first base station 802 may obtain channel state input information for a wireless device based on, at least in part, processing the downlink beamforming information. The first base station may transmit the channel state input information 804 to the wireless device 803 in a message, for example, a measurement information message. The wireless device 803 may use the channel state input information to compute a precoding matrix indicator. The first base station 802 may receive a channel state feedback 805 from the wireless device. The channel state feedback may comprise the precoding matrix indicator. Each of the beamforming codewords may be represented by an index and may belong to a first beamforming codebook. The correspondence between a beamforming codeword and an index may be defined by an application protocol message received prior to the at least one application protocol message reception. The base station may transmit packets to the wireless device 803 using beamforming transmission 806.

Figure 9:
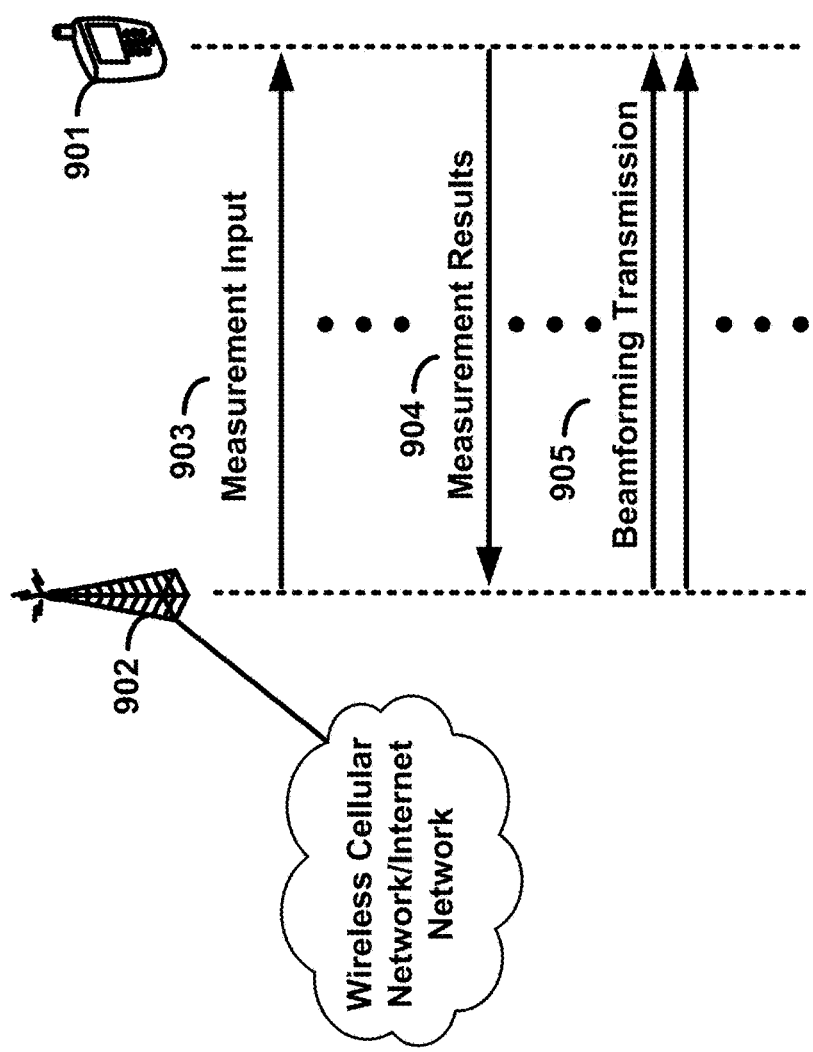
FIG. 9 depicts message flows between a base station and a wireless device as per an aspect of an embodiment of the present invention.

FIG. 9 depicts message flow between a base station 902 and a wireless device 901, according to at least one embodiment. The first base station 902 may receive at least one application protocol message from a second base station in the plurality of base stations. The second base station may comprise a downlink carrier comprising a plurality of downlink resource blocks. The at least one application protocol message may comprise the number of antenna ports for the downlink carrier and downlink beamforming information for the downlink carrier. The downlink beamforming information may indicate, for each downlink resource block in the plurality of downlink resource blocks, a beamforming codeword employed for the downlink resource block. Each of the beamforming codewords may depend on the number of antenna ports and may be represented by an index and belonging to a first beamforming codebook. The first base station may select a subset of the downlink beamforming information for wireless device 901. The first base station 902 may transmit a control message 903 to wireless device 901. The control message may comprise an identifier of the second base station, and the subset of the downlink beamforming information. First base station 902 may receive a channel state feedback 904 from the wireless device 901. The channel state feedback may comprise a precoding matrix indicator. The wireless device 901 may measure reference signals received from the second base station and process the measured reference signals based, at least in part, on the subset to compute the precoding matrix indicator. The first base station 902 may transmit packets to the wireless device 901 using beamforming transmission 905.

Figure 13:
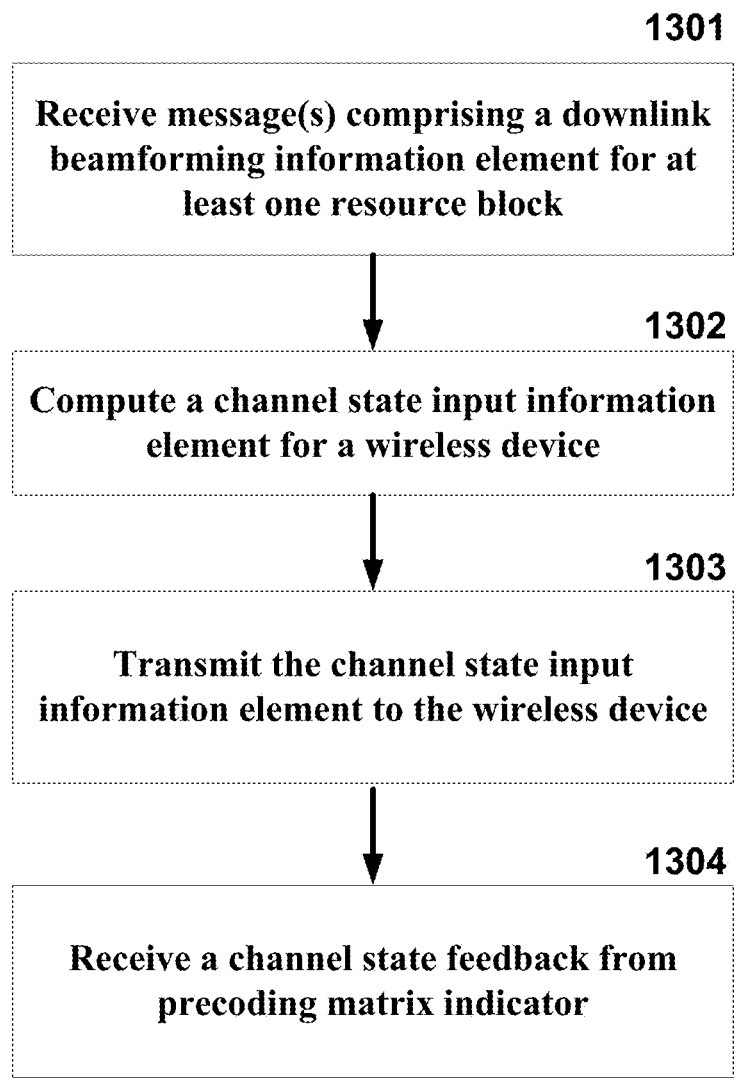
FIG. 13 depicts an example flow chart for a base station employing beamforming as per an aspect of an embodiment of the present invention.

FIG. 13 depicts an example flow chart for a base station employing beamforming as per an aspect of an embodiment of the present invention. A first base station may receive from a second base station at least one application protocol message as shown in 1301. The first base station and the second base station may be configured to communicate with a plurality of wireless devices employing a downlink carrier. The downlink carrier may comprise a plurality of resource blocks. The at least one application protocol message may comprise a downlink beamforming information element for at least one resource block in the downlink carrier. The downlink beamforming information element may indicate a second beamforming codeword employed by the second base station for the at least one resource block. The second beamforming codeword may be included in (be a part of) a second beamforming codebook. The first base station may compute a channel state input information element for a wireless device based on, at least in part, processing the downlink beamforming information element as shown in 1302. The first base station may transmit the channel state input information element to the wireless device for computing a precoding matrix indicator as shown in 1303. The first base station may receive a channel state feedback from the wireless device. The channel state feedback may comprise the precoding matrix indicator as shown in 1304.

According to some of the various aspects of embodiments, a wireless device may receive channel state input information from a first base station. The wireless device may compute a precoding matrix indicator using the channel state input information. The wireless device may transmit a channel state information comprising the precoding matrix indicator to the first base station.

According to some of the various aspects of embodiments, the wireless device may receive channel state input information from a first base station in the plurality of base stations. The first base station may obtain the channel state input information based, at least in part, on processing downlink beamforming information received from a second base station in the plurality of base stations. The first base station may compute a precoding matrix indicator using the channel state input information. The first base station may transmit a channel state information comprising the precoding matrix indicator to the first base station.

According to some of the various aspects of embodiments, the wireless device may receive channel state input information from a first base station in the plurality of base stations. The first base station may obtain the channel state input information based, at least in part, on processing downlink beamforming information received from a second base station in the plurality of base stations. The second base station may comprise a downlink carrier comprising a plurality of downlink resource blocks. The downlink beamforming information may indicate a beamforming codeword employed by the second base station for each downlink resource block in the plurality of downlink resource blocks. The wireless device may compute a precoding matrix indicator using the channel state input information. The wireless device may transmit channel state information comprising the precoding matrix indicator to the first base station.

According to some of the various aspects of embodiments, the wireless device may receive a control message from a first base station in the plurality of base stations. The control message may comprise an identifier of a second base station in the plurality of base stations, and channel state input information. The channel state input information may be a subset of downlink beamforming information received from the second base station. The second base station may comprise a downlink carrier comprising a plurality of downlink resource blocks. The downlink beamforming information may indicate a beamforming codeword employed by the second base station for each downlink resource block in the plurality of downlink resource blocks. The wireless device may measure reference signals received from the second base station. The wireless device may process the measured reference signals based, at least in part, on the channel state input information to compute a precoding matrix indicator. The wireless device may transmit channel state information comprising the precoding matrix indicator to the first base station. The processing of the measured reference signals may comprise multiplying measured reference signal(s) by at least one codeword in the channel state input information.

According to some of the various aspects of embodiments, a wireless device may receive a control message from a first base station. The control message may comprise an identifier of a second base station in the plurality of base stations. The control message may comprise a channel state input information element. The channel state input information element may be based, at least in part, on a downlink beamforming information element received by the first base station from a second base station. The downlink beamforming information element may indicate a beamforming codeword employed by the second base station for at least one downlink resource block. The wireless device may measure reference signals received from the second base station. The wireless device may process the measured reference signals based, at least in part, on the channel state input information element to compute a precoding matrix indicator. The wireless device may transmit a channel state information comprising the precoding matrix indicator to the first base station. The processing of the measured reference signals may comprise multiplying measured reference signal by at least one codeword in the channel state input information.

According to some of the various aspects of embodiments, a wireless device may receive from a first base station a channel state input information element. The channel state input information element may be based, at least in part, on a downlink beamforming information element received by the first base station from a second base station. The downlink beamforming information element may indicate a beamforming codeword employed by the second base station for at least one downlink resource block. The wireless device may compute a precoding matrix indicator employing the channel state input information element. The wireless device may transmit channel state information comprising the precoding matrix indicator to the first base station.

The channel state input information may be a codebook subset restriction bitmap parameter. The wireless device may select a precoding matrix indicator from a subset of the precoding codebook indicated by the codebook subset restriction bitmap parameter. The processing of the measured reference signals may include vector quantization and encoding. The processing of the measured reference signals may comprise multiplying measured reference signal(s) by at least one codeword in the downlink beamforming information. The wireless device may further measure the data signals received from the base station. The precoding matrix indicator may be calculated to reduce downlink inter-cell interference. The channel state feedback may further comprise a channel quality indicator. The channel state feedback may further comprise a rank indicator. The precoding matrix indicator may be selected from a plurality of predetermined precoding matrix indicators.

The first base station may transmit a plurality of packets to the wireless device. The plurality of packets may be transmitted using the precoding matrix indicator. The precoding matrix indicator may be computed for a sub-band of the downlink carrier. The first base station may further transmit at least one control message to the wireless device. The at least one control message may configure measurement parameters of the wireless device. The first base station may demodulate, despread, and decode the received channel state feedback. The channel state feedback may be modulated using SC-FDMA. The subset of the downlink beamforming information may comprise a plurality of beamforming codewords employed for a subset of the plurality of downlink resource blocks. The wireless device may use a zero-forcing criterion to compute the precoding matrix indicator. The wireless device may use a minimum mean squared error criterion to compute the precoding matrix indicator.

The subset of downlink beamforming information may comprise beam information from the second base station that causes substantial inter-cell interference to the wireless device. The first beamforming codebook may be defined for a maximum number of transmit antennas and may comprise a set of original codewords. Each original codeword may have a number of rows (or columns) equal to the maximum number of transmit antennas. Codewords for a smaller number of transmit antennas may be constructed by using a subset of rows (or columns) of the original codewords. The first beamforming codebook may be defined for a maximum number of layers and comprise a set of original codewords. Each original codeword may have a number of columns (or rows) equal to the maximum number of layers. Codewords for a smaller number of layers may be constructed by using a subset of columns of the original codewords. The smaller number of layers may be equal to a rank indicated by the wireless device through a rank indicators field in the channel state feedback.

Embodiments of the present invention enable the intelligent transfer of a wireless device between base stations that accounts for configuration of channel state information reference signals and configuration of channel state information interference measurement resources. An issue with respect to configuration of channel state information reference signals and configuration of channel state information interference measurement resources is the maintenance and updating of carrier configurations during a wireless device handover from a serving base station to a target base station. A wireless device may be configured with configuration of channel state information reference signals and configuration of channel state information interference measurement resources with a serving base station. A target base station may maintain the same configuration, or may direct the updating of a wireless device's configuration. There is a need for developing a signalling flow, wireless device processes, and base station processes to address wireless device configuration of channel state information reference signals and configuration of channel state information interference measurement resources during a handover to reduce handover overhead and handover delay.

According to some of the various aspects of embodiments, in connected mode, the network may control wireless device mobility. For example, the network may decide when and to which base station the wireless device connects. For network controlled mobility in connected mode, a primary carrier may be changed using an RRC connection reconfiguration message that includes mobility control information (handover). The network may trigger the handover procedure (e.g. based on radio conditions, load, QoS, wireless device category, and/or the like). The network may configure the wireless device to perform measurement reporting. The network may also initiate a handover blindly (e.g. without having received measurement reports from the wireless device). Before sending the handover message to the wireless device, the source base station may prepare one or more target cells. The source base station may select a target primary cell. The source base station may also provide the target base station with a list of best cells on a frequency for which measurement information is available (e.g. in order of decreasing signal strength level). The source base station may also include available measurement information for the cells provided in the list. The target base station may decide configuration of channel state information reference signals and configuration of channel state information interference measurement resources after the handover, which may include configuration parameters other than the ones indicated by the source base station.

The target base station may generate a message used to configure channel state information reference signals and channel state information interference measurement resources for the wireless device for the handover, for example, the message including carrier configuration parameters to be used in the target base station. The source base station may transparently (e.g., may not alter values/content) forward the handover message/information received from the target base station to the wireless device. After receiving the handover message, the wireless device may attempt to access the target primary cell at the available random access channel resources according to a random access resource selection. Upon successful completion of the handover, the wireless device may send a message used to confirm the handover to the target base station. The wireless device may use the target carrier configuration received from the source base station in communicating with the target base station.

According to some of the various aspects of embodiments, a base station may receive a first message indicating wireless device capability. The base station may consider a wireless device's capability in configuring channel state information reference signals and channel state information interference measurement resources for a wireless device. A wireless device may be configured with a configuration that is compatible with the wireless device's capability. Configuration capability for processing multiple channel state information reference signals and processing multiple channel state information interference measurement resources may not be supported by wireless devices not compatible with LTE release 11 or above. A wireless device may transmit its capability to a base station via an RRC message. The base station may consider wireless device capability in configuring multiple channel state information reference signals and multiple channel state information interference measurement resources for the wireless device.

The wireless device context within the source base station may contain information regarding roaming/handover restrictions which may be provided either at connection establishment or at the last tracking area update process. The source base station may configure the wireless device measurement procedures employing at least one RRC connection reconfiguration message. The wireless device may be triggered to send at least one measurement report by the rules set by, for example: system information, RRC configuration, and/or the like. The source base station may make a handover decision based on many parameters, such as: measurement reports, radio resource configuration information, traffic and load information, a combination of the above, and/or the like. The source base station may initiate the handover procedure by sending a handover request message to one or more potential target base stations.

The source base station may transmit a handover request message to one or more potential target base stations by passing information to prepare the handover at the target side. The handover request message may comprise information indicating the wireless device's capability regarding support for processing multiple channel state information reference signals and configuration of multiple channel state information interference measurement resources. The target base station may employ the capability of the wireless device in order to properly configure carrier configuration of the wireless device before the wireless device connects to the target base station. The target base station may configure the wireless device considering the configuration limitations and capabilities of the wireless device. For example, if the wireless device does not support configuration of multiple channel state information reference signals and/or configuration of multiple channel state information interference measurement resources, the target base station may avoid trying to configure the wireless device with those configuration options. In another example embodiment, handover request messages may further comprise the current multiple channel state information reference signals configuration parameters and/or multiple channel state information interference measurement resources configuration parameters of the wireless device connected to the serving base station. During the handover preparation phase, the serving base station may transmit wireless device's configuration capability and/or wireless device's current configuration to one or more potential target base stations. In an example embodiment, the serving base station may provide information such as, for example, about wireless device dedicated radio resource configurations. This may, for example, include: multiple channel state information reference signals parameters, multiple channel state information interference measurement resources parameters, carrier parameters, enhanced PDCCH parameters, PDSCH parameters, physical layer parameters and channel parameters, power control parameters, carrier configuration parameters, frequency information, carrier type, cross carrier scheduling parameters, and/or dedicated MAC configuration parameters, a combination thereof, and/or the like. This information may be employed, at least in part, by the potential target base station to configure the wireless device, for example, to configure multiple channel state information reference signals parameters and multiple channel state information interference measurement resources parameters.

According to some of the various aspects of embodiments, handover admission control may be performed by the target base station dependent on many factors (e.g. QoS required for the wireless device bearers, wireless device capabilities, wireless device configuration, target base station load, a combination of the above, and/or the like). The target base station may configure the required resources according to the received information from the serving base station. The radio access configuration to be used in the target carrier may be specified independently (for example as an establishment) or as a delta compared to the radio access configuration used in the source cell (for example as a reconfiguration).

The target base station may prepare a handover and may send a handover request acknowledge message to a source base station. The handover request acknowledge message may include a transparent container to be sent to the wireless device as an RRC message to perform the handover. The container may include a new C-RNTI, target base station security algorithm identifiers for the selected security algorithms, a dedicated RACH preamble, access parameters, SIBs, and/or other configuration parameters. The transparent container may further comprise the multiple channel state information reference signals configuration parameters and, multiple channel state information interference measurement resources configuration parameters for connection of the wireless device to the target base station. The updated configurations may modify the existing configuration of the wireless device or may keep the same carrier configuration that the wireless device has with the serving base station. The target base station may generate the RRC message to perform the handover, for example, the RRC connection reconfiguration message including the mobility control information. The RRC message may be sent by the source base station towards the wireless device. The source base station may perform the necessary integrity protection and ciphering of the message. The wireless device may receive the RRC connection reconfiguration message from the source base station and may start performing the handover.

After receiving the RRC connection reconfiguration message, including the mobility control information, the wireless device may perform synchronization to the target base station and access the target cell via a random access channel on a primary cell. The wireless device may derive target base station specific keys and may configure the selected security algorithms to be used in the target cell. The target base station may respond with uplink allocation and timing advance information. After the wireless device has successfully accessed the target cell, the wireless device may send an RRC connection reconfiguration complete message to confirm the handover and to indicate that the handover procedure is completed for the wireless device. The target base station may now begin sending and receiving data with the wireless device.

Figure 14:
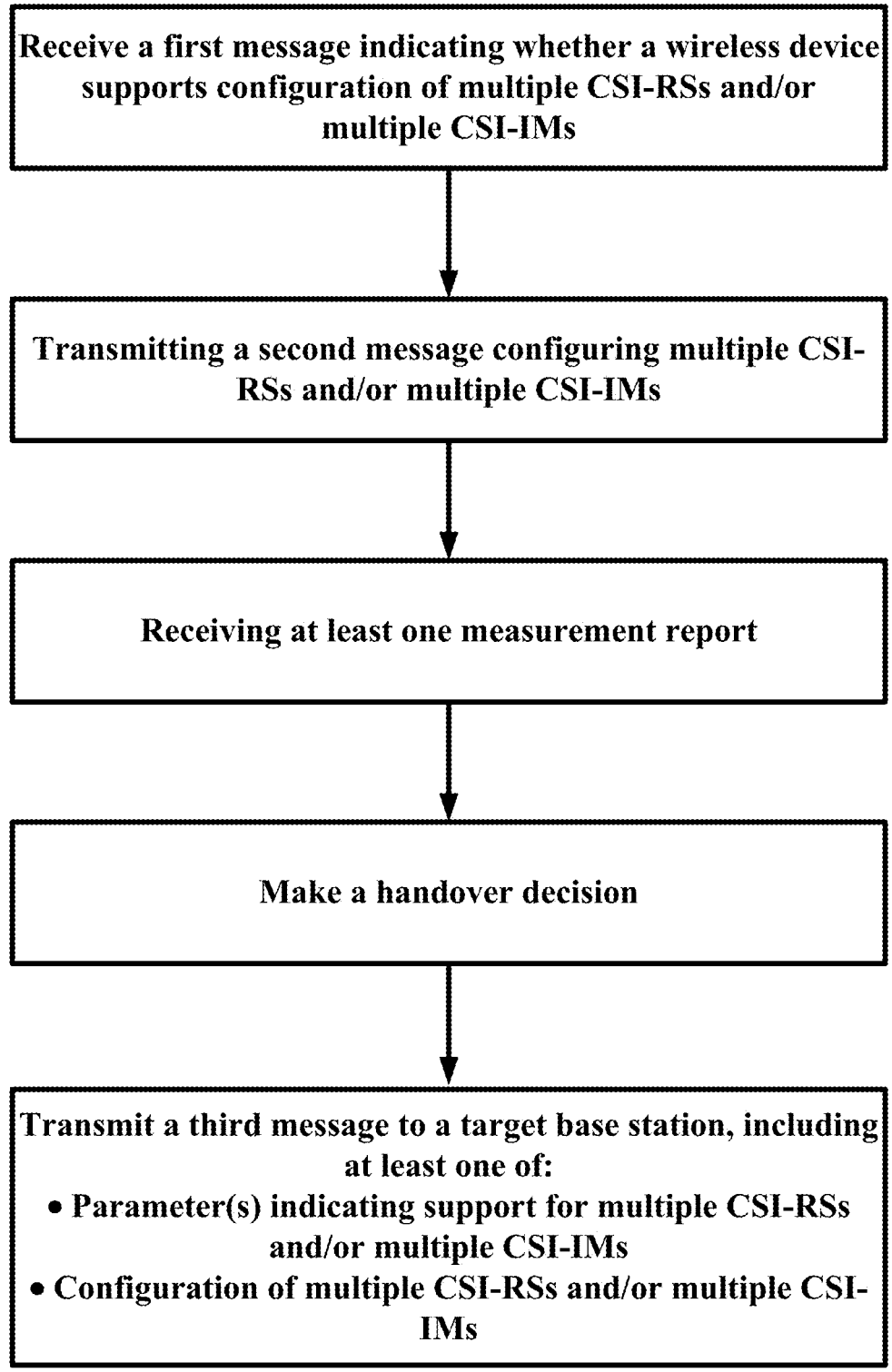
FIG. 14 depicts an example flow chart for a handover process as per an aspect of an embodiment of the present invention.

FIG. 14 depicts an example flow chart for a handover process as per an aspect of an embodiment of the present invention. According to some of the various aspects of embodiments, a serving base station may receive a first message from a wireless device on a carrier. The first message may comprise one or more parameters implicitly or explicitly indicating whether the wireless device supports configuration of: a) a maximum of k channel state information reference signals for the carrier, k being an integer greater than one; and b) a maximum of n channel state information interference measurement resources for the carrier, n being an integer greater than one. For example, the first message may include a first parameter that indicates whether the wireless device supports processing multiple channel state information reference signals and configuration of multiple channel state information interference measurement resources. In another example, the first message may include a parameter indicating the release version of the wireless device, which may implicitly indicate whether the wireless device supports multiple channel state information reference signals and configuration of multiple channel state information interference measurement resources. In another example, a parameter may indicate radio capabilities of the wireless device which implicitly or explicitly indicate whether the wireless device supports processing multiple channel state information reference signals and configuration of multiple channel state information interference measurement resources. In an example embodiment, k may be equal to n. In an implementation example, a first value of a capability parameter in the first message may indicate a first k value and a first n value. A second value of a capability parameter may indicate a second k value and a second n value. In another example embodiment, a parameter in the first message may determine a device category, which in turn may determine a value for k and n. For example, a first device category may indicate that k=n=5, and a second device category may indicate k=7, and n=6.

The serving base station may transmit at least one second message to the wireless device. At least some parameters in the at least one second message may depend at least in part on the first message. For example, if the first message indicates that the device supports processing multiple channel state information reference signals and configuration of multiple channel state information interference measurement resources, at least some parameters in the at least one second message may configure these parameters. In another example, if the first message indicates that the wireless device supports non-backward compatible carriers, then the base station may configure non-backward compatible carriers for the carrier. The base station may configure the wireless device considering the capability parameters of the wireless device received in the first message. For example, if the first message indicates certain capability in the wireless device, the base station may configure those capabilities. In another example, if the first base station indicates that certain capabilities are not supported in the wireless device, the base station may not configure those capabilities. For example, if the wireless device does not support multiple time alignment groups, the base station may not configure multiple time alignment groups for the wireless device.

According to some of the various aspects of embodiments, the at least one second message may comprise: one or more channel state information reference signals parameters, one or more channel state information interference measurement resources parameters, a plurality of measurement parameters, and/or a combination of the above. The at least one second message may be configured to cause configured to cause: a) configuration of j channel state information reference signals for the carrier, j being an integer smaller than or equal to k, b) configuration of m channel state information interference measurement resources for the carrier, m being an integer smaller than or equal to n, c) the wireless device measuring signal quality of at least one carrier of one or more target base stations in response to the measurement parameters, d) one or more of the above configurations in a, b, and c. The base station may configure the channel state information reference signals and channel state information interference measurement resources within the capability of the wireless device.

The base station may configure multiple channel state information reference signals (CSI-RSs). Each of the many CSI-RSs may be periodically transmitted on downlink OFDM radio resources according to its configuration parameters. CSI-RSs signal codes are known by the wireless device. The wireless device may measure the CSI-RSs and may report back CSI-RSs measurement information to the base station. The base station may configure a plurality of carriers for a wireless device and each carrier may be configured to transmit a plurality of CSI-RSs to the wireless device. CSI-RSs on different carriers may or may not have the same configuration. The wireless device may measure CSI-RSs on activated carriers and may report the measurements back to the base station. The base station may also configure a plurality of channel state information interference measurement resources (CSI-IMs). In an example embodiment, the base station may not transmit information in OFDM radio resources defined by CSI-IMs configuration parameters. The wireless device may measure interference in OFDM radio resources defined by CSI-IMs configuration parameters and may report this information back to the base station. The base station may configure a plurality of carriers for a wireless device and each carrier may be configured with a plurality of CSI-IMs to the wireless device. The wireless device may measure interference in CSI-IM resources on activated carriers and may report them back to the base station. CSI-IM configuration on different carriers may use the same or different configuration parameters.

According to some of the various aspects of embodiments, the serving base station may receive at least one measurement report from the wireless device. The serving base station may receive at least one measurement report from the wireless device in response to the at least one second message. The at least one measurement report may comprise signal quality information of at least one carrier the at least one carrier of at least one of the one or more target base stations. The signal quality information may be derived at least in part employing measurements of at least one OFDM subcarrier. The base station may receive CSI-RS measurement reports and measurement reports of target base stations signals. These two category of measurement reports may have different formats and may be transmitted separately to the serving base station at different times employing different uplink messages/signals.

The serving base station may make a handover decision based at least in part on the at least one measurement report. The serving base station may transmit in response to the serving base station making a handover decision for the wireless device, at least one third message to at least one target base station. The at least one third message may comprise the one or more parameters implicitly or explicitly indicating whether the wireless device supports the configuration of: a) the maximum of k channel state information reference signals; and/or b) the maximum of n channel state information interference measurement resources. The at least one third message may further comprise configuration parameters of: a) the j channel state information reference signals for the carrier; and/or b) the m channel state information interference measurement resources for the carrier.

According to some of the various aspects of embodiments, before the at least one second message is transmitted, the serving base station may encrypt the at least one second message; and/or may protect the at least one second message by an integrity header. The at least one second message may further include configuration information for physical channels for the wireless device. The at least one second message may be configured to cause the wireless device to set up or modify at least one radio bearer. One of the at least one second message may be configured to cause the wireless device to configure at least one of a physical layer parameter, a media access control layer parameter and a radio link control layer parameter.

One of the at least one second message may comprise radio link configuration information comprising uplink channel configuration parameters and handover parameters. One of the at least one second message may comprise radio resource configuration parameters comprising a physical channel configuration parameters. The serving base station may transmit a demodulation reference signal on the carrier.

According to some of the various aspects of embodiments, a serving base station may receive a first message from a wireless device on a carrier. The first message may comprise one or more parameters implicitly or explicitly indicating whether the wireless device supports configuration of a maximum of k channel state information reference signals for the carrier, k being an integer greater than one. The first message may further comprise one or more parameters implicitly or explicitly indicating whether the wireless device supports configuration of a maximum of n channel state information interference measurement resources for the carrier, n being an integer greater than one.

The serving base station may transmit to the wireless device, at least one second message. At least some parameters in the at least one second message may depend at least in part on the first message. The at least one second message may be configured to cause configuration of j channel state information reference signals for the carrier, j being an integer smaller than or equal to k. The at least one second message may be configured to further cause configuration of m channel state information interference measurement resources for the carrier, m being an integer smaller than or equal to n. The serving base station may transmit in response to the serving base station making a handover decision for the wireless device, at least one third message to at least one target base station. The at least one third message may comprising at least one of: a) the one or more parameters, b) configuration parameters of the j channel state information reference signals and/or the m channel state information interference measurement resources. The one or more parameters may implicitly or explicitly indicating whether the wireless device supports the configuration of the maximum of k channel state information reference signals; and/or the maximum of n channel state information interference measurement resources.

The disclosed embodiment considers two sets of configuration parameters, one for multiple channel state information reference signals and the other for multiple channel state information interference measurement resources. Some embodiments of the invention may be implemented including one of these sets. For example, the disclosed handover processes may consider configuration of multiple channel state information reference signals and not consider configuration of multiple channel state information interference measurement resources. In another example embodiment, the disclosed handover processes may consider configuration of multiple channel state information interference measurement resources and not consider configuration of multiple channel state information reference signals.

Figure 15:
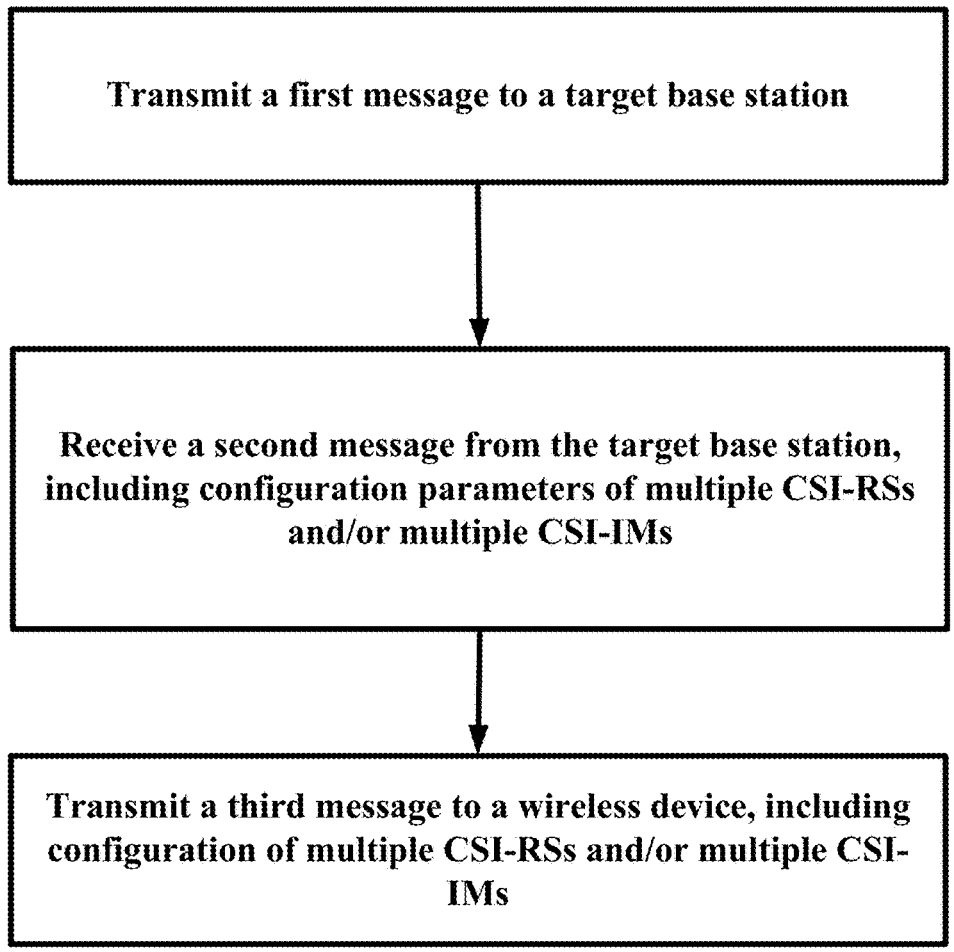
FIG. 15 depicts an example flow chart for a handover process as per an aspect of an embodiment of the present invention.

FIG. 15 depicts an example flow chart for a handover process as per an aspect of an embodiment of the present invention. According to some of the various aspects of embodiments, a serving base station may transmit in response to the serving base station making a handover decision for a wireless device, at least one first message to at least one target base station. The at least one first message may comprise one or more parameters implicitly or explicitly indicating whether the wireless device supports configuration of a) a maximum of k channel state information reference signals for a carrier, k being an integer greater than one; and/or b) a maximum of n channel state information interference measurement resources for the carrier, n being an integer greater than one.

The at least one first message may further comprise configuration parameters of: a) j channel state information reference signals for the carrier, j being an integer smaller than or equal to k; and/or m channel state information interference measurement resources for the carrier, m being an integer smaller than or equal to n. The at least one first message may comprise one of many of the above parameters. In different example embodiments of the invention, the at least one first message may comprise at least one of, or all of, or some of the above parameters.

The serving base station may receive at least one second message from one of the at least one target base station. The at least one second message may comprise configuration parameters of: p channel state information reference signals for the carrier, p being an integer smaller than or equal to k; and/or q channel state information interference measurement resources for the carrier, q being an integer smaller than or equal to n. The configuration parameters in the at least one second message are within the capability of the wireless device as indicated in the at least one first message.

The serving base station may transmit in response to receiving the at least one second message, a third message to the wireless device. The third message may comprise the configuration parameters of: the p channel state information reference signals; and/or the q channel state information interference measurement resources. The serving base station transmits this configuration along with a handover command in an RRC message to the wireless device. The wireless device then synchronizes with the target base station and connects to the target base station according to the configuration parameters received in the third message.

According to some of the various aspects of embodiments, before the third message is transmitted, the serving base station may encrypt the third message; and may protect the third message by an integrity header. The third message may further include configuration information for physical channels for the wireless device. The third message may be configured to cause the wireless device to set up or modify at least one radio bearer. The third message may be configured to cause the wireless device to configure at least one of a physical layer parameter, a media access control layer parameter and an radio link control layer parameter. The third message may comprise radio link configuration information comprising uplink channel configuration parameters and handover parameters.

According to some of the various aspects of embodiments, the third message may comprise at least one radio resource configuration parameter comprising at least one physical channel configuration parameter. The one of the at least one target base station may transmit a plurality of channel state information reference signals on the carrier. The one of the at least one target base station may transmit a plurality of a demodulation reference signals on the carrier. The third message may further comprise configuration parameters of a plurality of carriers.

According to some of the various aspects of embodiments, the packets in the downlink may be transmitted via downlink physical channels. The carrying packets in the uplink may be transmitted via uplink physical channels. The baseband data representing a downlink physical channel may be defined in terms of at least one of the following actions: scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on layer(s) for transmission on the antenna port(s); mapping of complex-valued modulation symbols for antenna port(s) to resource elements; and/or generation of complex-valued time-domain OFDM signal(s) for antenna port(s).

Codeword, transmitted on the physical channel in one subframe, may be scrambled prior to modulation, resulting in a block of scrambled bits. The scrambling sequence generator may be initialized at the start of subframe(s). Codeword(s) may be modulated using QPSK, 16QAM, 64QAM, 128QAM, and/or the like resulting in a block of complex-valued modulation symbols. The complex-valued modulation symbols for codewords to be transmitted may be mapped onto one or several layers. For transmission on a single antenna port, a single layer may be used. For spatial multiplexing, the number of layers may be less than or equal to the number of antenna port(s) used for transmission of the physical channel. The case of a single codeword mapped to multiple layers may be applicable when the number of cell-specific reference signals is four or when the number of UE-specific reference signals is two or larger. For transmit diversity, there may be one codeword and the number of layers may be equal to the number of antenna port(s) used for transmission of the physical channel.

The precoder may receive a block of vectors from the layer mapping and generate a block of vectors to be mapped onto resources on the antenna port(s). Precoding for spatial multiplexing using antenna port(s) with cell-specific reference signals may be used in combination with layer mapping for spatial multiplexing. Spatial multiplexing may support two or four antenna ports and the set of antenna ports used may be {0,1} or {0, 1, 2, 3}. Precoding for transmit diversity may be used in combination with layer mapping for transmit diversity. The precoding operation for transmit diversity may be defined for two and four antenna ports. Precoding for spatial multiplexing using antenna ports with UE-specific reference signals may also, for example, be used in combination with layer mapping for spatial multiplexing. Spatial multiplexing using antenna ports with UE-specific reference signals may support up to eight antenna ports. Reference signals may be pre-defined signals that may be used by the receiver for decoding the received physical signal, estimating the channel state, and/or other purposes.

For antenna port(s) used for transmission of the physical channel, the block of complex-valued symbols may be mapped in sequence to resource elements. In resource blocks in which UE-specific reference signals are not transmitted the PDSCH may be transmitted on the same set of antenna ports as the physical broadcast channel in the downlink (PBCH). In resource blocks in which UE-specific reference signals are transmitted, the PDSCH may be transmitted, for example, on antenna port(s) {5, {7}, {8}, or {7, 8, . . . , v+6}, where v is the number of layers used for transmission of the PDSCH.

Common reference signal(s) may be transmitted in physical antenna port(s). Common reference signal(s) may be cell-specific reference signal(s) (RS) used for demodulation and/or measurement purposes. Channel estimation accuracy using common reference signal(s) may be reasonable for demodulation (high RS density). Common reference signal(s) may be defined for LTE technologies, LTE-advanced technologies, and/or the like. Demodulation reference signal(s) may be transmitted in virtual antenna port(s) (i.e., layer or stream). Channel estimation accuracy using demodulation reference signal(s) may be reasonable within allocated time/frequency resources. Demodulation reference signal(s) may be defined for LTE-advanced technology and may not be applicable to LTE technology. Measurement reference signal(s), may also called CSI (channel state information) reference signal(s), may be transmitted in physical antenna port(s) or virtualized antenna port(s). Measurement reference signal(s) may be Cell-specific RS used for measurement purposes. Channel estimation accuracy may be relatively lower than demodulation RS. CSI reference signal(s) may be defined for LTE-advanced technology and may not be applicable to LTE technology.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols. Antenna port(s) may be defined such that the channel over which symbol(s) on antenna port(s) may be conveyed and/or inferred from the channel over which other symbol(s) on the same antenna port(s) is/are conveyed. There may be one resource grid per antenna port. The antenna port(s) used for transmission of physical channel(s) or signal(s) may depend on the number of antenna port(s) configured for the physical channel(s) or signal(s).

Element(s) in a resource grid may be called a resource element. A physical resource block may be defined as N consecutive SC-FDMA symbols in the time domain and/or M consecutive subcarriers in the frequency domain, wherein M and N may be pre-defined integer values. Physical resource block(s) in uplink(s) may comprise of M×N resource elements. For example, a physical resource block may correspond to one slot in the time domain and 180 kHz in the frequency domain. Baseband signal(s) representing the physical uplink shared channel may be defined in terms of: a) scrambling, b) modulation of scrambled bits to generate complex-valued symbols, c) mapping of complex-valued modulation symbols onto one or several transmission layers, d) transform precoding to generate complex-valued symbols, e) precoding of complex-valued symbols, f) mapping of precoded complex-valued symbols to resource elements, g) generation of complex-valued time-domain SC-FDMA signal(s) for antenna port(s), and/or the like.

For codeword(s), block(s) of bits may be scrambled with UE-specific scrambling sequence(s) prior to modulation, resulting in block(s) of scrambled bits. Complex-valued modulation symbols for codeword(s) to be transmitted may be mapped onto one, two, or more layers. For spatial multiplexing, layer mapping(s) may be performed according to pre-defined formula(s). The number of layers may be less than or equal to the number of antenna port(s) used for transmission of physical uplink shared channel(s). The example of a single codeword mapped to multiple layers may be applicable when the number of antenna port(s) used for PUSCH is, for example, four. For layer(s), the block of complex-valued symbols may be divided into multiple sets, each corresponding to one SC-FDMA symbol. Transform precoding may be applied. For antenna port(s) used for transmission of the PUSCH in a subframe, block(s) of complex-valued symbols may be multiplied with an amplitude scaling factor in order to conform to a required transmit power, and mapped in sequence to physical resource block(s) on antenna port(s) and assigned for transmission of PUSCH.

According to some of the various embodiments, data may arrive to the coding unit in the form of two transport blocks every transmission time interval (TTI) per UL cell. The following coding actions may be identified for transport block(s) of an uplink carrier: a) Add CRC to the transport block, b) Code block segmentation and code block CRC attachment, c) Channel coding of data and control information, d) Rate matching, e) Code block concatenation. f) Multiplexing of data and control information, g) Channel interleaver, h) Error detection may be provided on UL-SCH (uplink shared channel) transport block(s) through a Cyclic Redundancy Check (CRC), and/or the like. Transport block(s) may be used to calculate CRC parity bits. Code block(s) may be delivered to channel coding block(s). Code block(s) may be individually turbo encoded. Turbo coded block(s) may be delivered to rate matching block(s).

Physical uplink control channel(s) (PUCCH) may carry uplink control information. Simultaneous transmission of PUCCH and PUSCH from the same UE may be supported if enabled by higher layers. For a type 2 frame structure, the PUCCH may not be transmitted in the UpPTS field. PUCCH may use one resource block in each of the two slots in a subframe. Resources allocated to UE and PUCCH configuration(s) may be transmitted via control messages. PUCCH may comprise: a) positive and negative acknowledgements for data packets transmitted at least one downlink carrier, b) channel state information for at least one downlink carrier, c) scheduling request, and/or the like.

According to some of the various aspects of embodiments, cell search may be the procedure by which a wireless device may acquire time and frequency synchronization with a cell and may detect the physical layer Cell ID of that cell (transmitter). An example embodiment for synchronization signal and cell search is presented below. A cell search may support a scalable overall transmission bandwidth corresponding to 6 resource blocks and upwards. Primary and secondary synchronization signals may be transmitted in the downlink and may facilitate cell search. For example, 504 unique physical-layer cell identities may be defined using synchronization signals. The physical-layer cell identities may be grouped into 168 unique physical-layer cell-identity groups, group(s) containing three unique identities. The grouping may be such that physical-layer cell identit(ies) is part of a physical-layer cell-identity group. A physical-layer cell identity may be defined by a number in the range of 0 to 167, representing the physical-layer cell-identity group, and a number in the range of 0 to 2, representing the physical-layer identity within the physical-layer cell-identity group. The synchronization signal may include a primary synchronization signal and a secondary synchronization signal.

According to some of the various aspects of embodiments, the sequence used for a primary synchronization signal may be generated from a frequency-domain Zadoff-Chu sequence according to a pre-defined formula. A Zadoff-Chu root sequence index may also be predefined in a specification. The mapping of the sequence to resource elements may depend on a frame structure. The wireless device may not assume that the primary synchronization signal is transmitted on the same antenna port as any of the downlink reference signals. The wireless device may not assume that any transmission instance of the primary synchronization signal is transmitted on the same antenna port, or ports, used for any other transmission instance of the primary synchronization signal. The sequence may be mapped to the resource elements according to a predefined formula.

For FDD frame structure, a primary synchronization signal may be mapped to the last OFDM symbol in slots 0 and 10. For TDD frame structure, the primary synchronization signal may be mapped to the third OFDM symbol in subframes 1 and 6. Some of the resource elements allocated to primary or secondary synchronization signals may be reserved and not used for transmission of the primary synchronization signal.

According to some of the various aspects of embodiments, the sequence used for a secondary synchronization signal may be an interleaved concatenation of two length-31 binary sequences. The concatenated sequence may be scrambled with a scrambling sequence given by a primary synchronization signal. The combination of two length-31 sequences defining the secondary synchronization signal may differ between subframe 0 and subframe 5 according to predefined formula(s). The mapping of the sequence to resource elements may depend on the frame structure. In a subframe for FDD frame structure and in a half-frame for TDD frame structure, the same antenna port as for the primary synchronization signal may be used for the secondary synchronization signal. The sequence may be mapped to resource elements according to a predefined formula.

Example embodiments for the physical channels configuration will now be presented. Other examples may also be possible. A physical broadcast channel may be scrambled with a cell-specific sequence prior to modulation, resulting in a block of scrambled bits. PBCH may be modulated using QPSK, and/or the like. The block of complex-valued symbols for antenna port(s) may be transmitted during consecutive radio frames, for example, four consecutive radio frames. In some embodiments the PBCH data may arrive to the coding unit in the form of a one transport block every transmission time interval (TTI) of 4 ms. The following coding actions may be identified. Add CRC to the transport block, channel coding, and rate matching. Error detection may be provided on PBCH transport blocks through a Cyclic Redundancy Check (CRC). The transport block may be used to calculate the CRC parity bits. The parity bits may be computed and attached to the BCH (broadcast channel) transport block. After the attachment, the CRC bits may be scrambled according to the transmitter transmit antenna configuration. Information bits may be delivered to the channel coding block and they may be tail biting convolutionally encoded. A tail biting convolutionally coded block may be delivered to the rate matching block. The coded block may be rate matched before transmission.

A master information block may be transmitted in PBCH and may include system information transmitted on broadcast channel(s). The master information block may include downlink bandwidth, system frame number(s), and PHICH (physical hybrid-ARQ indicator channel) configuration. Downlink bandwidth may be the transmission bandwidth configuration, in terms of resource blocks in a downlink, for example 6 may correspond to 6 resource blocks, 15 may correspond to 15 resource blocks and so on. System frame number(s) may define the N (for example N=8) most significant bits of the system frame number. The M (for example M=2) least significant bits of the SFN may be acquired implicitly in the PBCH decoding. For example, timing of a 4 ms PBCH TTI may indicate 2 least significant bits (within 4 ms PBCH TTI, the first radio frame: 00, the second radio frame: 01, the third radio frame: 10, the last radio frame: 11). One value may apply for other carriers in the same sector of a base station (the associated functionality is common (e.g. not performed independently for each cell). PHICH configuration(s) may include PHICH duration, which may be normal (e.g. one symbol duration) or extended (e.g. 3 symbol duration).

Physical control format indicator channel(s) (PCFICH) may carry information about the number of OFDM symbols used for transmission of PDCCHs (physical downlink control channel) in a subframe. The set of OFDM symbols possible to use for PDCCH in a subframe may depend on many parameters including, for example, downlink carrier bandwidth, in terms of downlink resource blocks. PCFICH transmitted in one subframe may be scrambled with cell-specific sequence(s) prior to modulation, resulting in a block of scrambled bits. A scrambling sequence generator(s) may be initialized at the start of subframe(s). Block (s) of scrambled bits may be modulated using QPSK. Block(s) of modulation symbols may be mapped to at least one layer and precoded resulting in a block of vectors representing the signal for at least one antenna port. Instances of PCFICH control channel(s) may indicate one of several (e.g. 3) possible values after being decoded. The range of possible values of instance(s) of the first control channel may depend on the first carrier bandwidth.

According to some of the various embodiments, physical downlink control channel(s) may carry scheduling assignments and other control information. The number of resource-elements not assigned to PCFICH or PHICH may be assigned to PDCCH. PDCCH may support multiple formats. Multiple PDCCH packets may be transmitted in a subframe. PDCCH may be coded by tail biting convolutionally encoder before transmission. PDCCH bits may be scrambled with a cell-specific sequence prior to modulation, resulting in block(s) of scrambled bits. Scrambling sequence generator(s) may be initialized at the start of subframe(s). Block(s) of scrambled bits may be modulated using QPSK. Block(s) of modulation symbols may be mapped to at least one layer and precoded resulting in a block of vectors representing the signal for at least one antenna port. PDCCH may be transmitted on the same set of antenna ports as the PBCH, wherein PBCH is a physical broadcast channel broadcasting at least one basic system information field.

According to some of the various embodiments, scheduling control packet(s) may be transmitted for packet(s) or group(s) of packets transmitted in downlink shared channel(s). Scheduling control packet(s) may include information about subcarriers used for packet transmission(s). PDCCH may also provide power control commands for uplink channels. OFDM subcarriers that are allocated for transmission of PDCCH may occupy the bandwidth of downlink carrier(s). PDCCH channel(s) may carry a plurality of downlink control packets in subframe(s). PDCCH may be transmitted on downlink carrier(s) starting from the first OFDM symbol of subframe(s), and may occupy up to multiple symbol duration(s) (e.g. 3 or 4).

According to some of the various embodiments, PHICH may carry the hybrid-ARQ (automatic repeat request) ACK/NACK. Multiple PHICHs mapped to the same set of resource elements may constitute a PHICH group, where PHICHs within the same PHICH group may be separated through different orthogonal sequences. PHICH resource(s) may be identified by the index pair (group, sequence), where group(s) may be the PHICH group number(s) and sequence(s) may be the orthogonal sequence index within the group(s). For frame structure type 1, the number of PHICH groups may depend on parameters from higher layers (RRC). For frame structure type 2, the number of PHICH groups may vary between downlink subframes according to a pre-defined arrangement. Block(s) of bits transmitted on one PHICH in one subframe may be modulated using BPSK or QPSK, resulting in a block(s) of complex-valued modulation symbols. Block(s) of modulation symbols may be symbol-wise multiplied with an orthogonal sequence and scrambled, resulting in a sequence of modulation symbols Other arrangements for PCFICH, PHICH, PDCCH, and/or PDSCH may be supported. The configurations presented here are for example purposes. In another example, resources PCFICH, PHICH, and/or PDCCH radio resources may be transmitted in radio resources including a subset of subcarriers and pre-defined time duration in each or some of the subframes. In an example, PUSCH resource(s) may start from the first symbol. In another example embodiment, radio resource configuration(s) for PUSCH, PUCCH, and/or PRACH (physical random access channel) may use a different configuration. For example, channels may be time multiplexed, or time/frequency multiplexed when mapped to uplink radio resources.

According to some of the various aspects of embodiments, a wireless device may be preconfigured with one or more carriers. When the wireless device is configured with more than one carrier, the base station and/or wireless device may activate and/or deactivate the configured carriers. One of the carriers (the primary carrier) may always be activated. Other carriers may be deactivated by default and/or may be activated by a base station when needed. A base station may activate and deactivate carriers by sending an activation/deactivation MAC control element. Furthermore, the UE may maintain a carrier deactivation timer per configured carrier and deactivate the associated carrier upon its expiry. The same initial timer value may apply to instance(s) of the carrier deactivation timer. The initial value of the timer may be configured by a network. The configured carriers (unless the primary carrier) may be initially deactivated upon addition and after a handover.

According to some of the various aspects of embodiments, if a wireless device receives an activation/deactivation MAC control element activating the carrier, the wireless device may activate the carrier, and/or may apply normal carrier operation including: sounding reference signal transmissions on the carrier, CQI (channel quality indicator)/PMI (precoding matrix indicator)/RI (ranking indicator) reporting for the carrier, PDCCH monitoring on the carrier, PDCCH monitoring for the carrier, start or restart the carrier deactivation timer associated with the carrier, and/or the like. If the device receives an activation/deactivation MAC control element deactivating the carrier, and/or if the carrier deactivation timer associated with the activated carrier expires, the base station or device may deactivate the carrier, and may stop the carrier deactivation timer associated with the carrier, and/or may flush HARQ buffers associated with the carrier.

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method comprising:
    transmitting, by a first base station to a second base station and based on a handover decision for a wireless device, at least one first message comprising first configuration parameters for a first quantity of channel state information (CSI) reference signals, wherein the first quantity is less than or equal to a quantity of channel state information (CSI) processes supported by the wireless device;
    receiving, by the first base station and from the second base station, at least one second message comprising second configuration parameters for a second quantity of CSI reference signals, wherein the second quantity is less than or equal to the quantity of CSI processes supported by the wireless device; and
    transmitting, by the first base station and to the wireless device, a third message comprising the second configuration parameters.

2. The method of claim 1, wherein the third message is at least one of:
    an encrypted message; or
    a message comprising an integrity header.

3. The method of claim 1, wherein the third message comprises configuration parameters associated with:
    one or more physical channels; and
    at least one radio bearer.

4. The method of claim 1, wherein the third message comprises at least one of: a physical layer parameter, a media access control layer parameter, or a radio link control layer parameter.

5. The method of claim 1, wherein the third message comprises uplink channel configuration parameters and handover parameters.

6. The method of claim 1, wherein the third message comprises radio resource configuration parameters comprising one or more physical channel configuration parameters.

7. The method of claim 1, wherein the third message comprises third configuration parameters for a plurality of carriers.

8. The method of claim 1, wherein the first message further comprises one or more parameters indicating the quantity of channel state information (CSI) processes supported by the wireless device.

9. A method comprising:
    transmitting, by a first base station to a second base station and based on a handover decision for a wireless device, at least one first message comprising one or more parameters indicating that the wireless device supports configuration of a first quantity of channel state information (CSI) processes for a carrier;
    receiving, by the first base station and from the second base station, at least one second message comprising second configuration parameters for a second quantity of CSI reference signals, wherein the second quantity is less than or equal to the first quantity; and
    transmitting, by the first base station and to the wireless device, a third message comprising the second configuration parameters.

10. The method of claim 9, wherein the third message is at least one of:
    an encrypted message; or
    a message comprising an integrity header.

11. The method of claim 9, wherein the third message comprises configuration parameters associated with:
    one or more physical channels; and
    at least one radio bearer.

12. The method of claim 9, wherein the third message comprises at least one of: a physical layer parameter, a media access control layer parameter, or a radio link control layer parameter.

13. The method of claim 9, wherein the third message comprises uplink channel configuration parameters and handover parameters.

14. The method of claim 9, wherein the third message comprises radio resource configuration parameters comprising one or more physical channel configuration parameters.

15. The method of claim 9, wherein the third message comprises third configuration parameters for a plurality of carriers.

16. The method of claim 9, wherein the second configuration parameters further comprise third configuration parameters for a third quantity of CSI reference signals, and wherein the third quantity is less than or equal to the first quantity.

17. The method of claim 16, wherein the second quantity is less than the third quantity.

18. A method comprising:
receiving, by a first base station and from a wireless device, a first message comprising one or more parameters indicating that the wireless device supports configuration of a first quantity of channel state information (CSI) processes for a carrier;
transmitting, by the first base station and to the wireless device, at least one second message comprising configuration parameters for a second quantity of CSI reference signals for the carrier, wherein the second quantity is less than or equal to the first quantity; and
transmitting, by the first base station and to a second base station in response to a determination to perform a handover for the wireless device, at least one third message comprising an indication of the configuration parameters for the second quantity of CSI reference signals.

19. The method of claim 18, further comprising:
receiving, by the first base station and from the wireless device, at least one measurement report subsequent to the transmission of the at least one second message,
wherein the at least one measurement report comprises signal quality information of at least one carrier of the second base station.

20. The method of claim 19, further comprising determining to perform the handover based at least in part on the at least one measurement report.

21. The method of claim 18, wherein the at least one second message is at least one of:
at least one encrypted message; or
at least one message comprising an integrity header.

22. The method of claim 18, wherein the at least one second message further comprises configuration parameters associated with at least one physical channel, and wherein the at least one second message causes the wireless device to set up or modify at least one radio bearer.

23. The method of claim 18, wherein the at least one second message comprises at least one of: a physical layer parameter, a media access control layer parameter, or a radio link control layer parameter.

24. The method of claim 18, wherein the at least one second message comprises uplink channel configuration parameters and handover parameters.

25. The method of claim 18, wherein the at least one third message further comprises the one or more parameters indicating that the wireless device supports the configuration of the first quantity of CSI processes.

26. A method comprising:
receiving, by a first base station and from a wireless device, a first message comprising one or more parameters indicating that the wireless device supports configuration of a first quantity of channel state information (CSI) processes for a carrier;
transmitting, by the first base station and to the wireless device, at least one second message comprising configuration parameters for a second quantity of CSI reference signals for the carrier, wherein the second quantity is less than or equal to the first quantity; and
transmitting, by the first base station and to a second base station in response to a determination to perform a handover for the wireless device, at least one third message comprising an indication of the one or more parameters indicating that the wireless device supports the configuration of the first quantity of CSI processes.

27. The method of claim 26, further comprising:
receiving, by the first base station and from the wireless device, at least one measurement report subsequent to the transmission of the at least one second message,
wherein the at least one measurement report comprises signal quality information of at least one carrier of the second base station.

28. The method of claim 27, further comprising determining to perform the handover based at least in part on the at least one measurement report.

29. The method of claim 26, wherein the at least one second message is at least one of:
at least one encrypted message; or
at least one message comprising an integrity header.

30. The method of claim 26 wherein the at least one second message further comprises configuration parameters for at least one physical channel, and wherein the at least one second message causes the wireless device to set up or modify at least one radio bearer.

31. The method of claim 26, wherein the at least one second message comprises at least one of: a physical layer parameter, a media access control layer parameter, or a radio link control layer parameter.

32. The method of claim 26, wherein the at least one second message comprises uplink channel configuration parameters and handover parameters.

* * * * *

UNITED STATES PATENT AND TRADEMARK OFFICE
CERTIFICATE OF CORRECTION

PATENT NO. : 10,530,438 B2
APPLICATION NO. : 15/879570
DATED : January 7, 2020
INVENTOR(S) : Esmael Hejazi Dinan It is certified that error appears in the above-identified patent and that said Letters Patent is hereby corrected as shown below:

In the Specification

Detailed Description of Embodiments, Column 3, Line 26:
Please delete "1 ms" and insert --10 ms--

Detailed Description of Embodiments, Column 3, Line 30:
Delete "1 ms" and insert --10 ms--

Detailed Description of Embodiments, Column 17, Lines 9-10:
Delete "y[k]= √ρ̄z*[k]H[k]f[k]s [k]+z*[k]n[k]." and insert -- $y[k] = \sqrt{\rho}z^*[k]H[k]f[k]s[k] + z^*[k]n[k].$ --

Detailed Description of Embodiments, Column 38, Line 11:
Delete "4 ms." and insert --40 ms.--

Detailed Description of Embodiments, Column 38, Line 38:
Delete "4 ms" and insert --40 ms--

Detailed Description of Embodiments, Column 38, Line 39:
Delete "4 ms" and insert --40 ms--

Detailed Description of Embodiments, Column 39, Line 49:
After "symbols", insert --.--

Detailed Description of Embodiments, Column 40, Line 54:
Delete "Lab VIEWMathScript." and insert --LabVIEWMathScript.--

Signed and Sealed this
Thirteenth Day of December, 2022

Katherine Kelly Vidal
*Director of the United States Patent and Trademark Office*